(12) United States Patent
Chiou et al.

(10) Patent No.: US 10,100,255 B2
(45) Date of Patent: *Oct. 16, 2018

(54) LIQUID CRYSTAL ALIGNMENT AGENT AND LIQUID CRYSTAL ALIGNMENT FILM AND LIQUID CRYSTAL DISPLAY ELEMENT FORMED FROM THE LIQUID CRYSTAL ALIGNMENT AGENT

(71) Applicant: CHI MEI CORPORATION, Tainan (TW)

(72) Inventors: Shin-Rong Chiou, Tainan (TW); Wan-Ting Huang, Kaohsiung (TW); Tsung-Pei Tsai, Tainan (TW)

(73) Assignee: CHI MEI CORPORATION, Tainan (TW)

( * ) Notice: Subject to any disclaimer, the term of this patent is extended or adjusted under 35 U.S.C. 154(b) by 315 days.

This patent is subject to a terminal disclaimer.

(21) Appl. No.: 14/965,302

(22) Filed: Dec. 10, 2015

(65) Prior Publication Data

US 2016/0168468 A1    Jun. 16, 2016

(30) Foreign Application Priority Data

Dec. 11, 2014 (TW) .............................. 103143295 A

(51) Int. Cl.
| | | |
|---|---|---|
| *C09K 19/56* | (2006.01) | |
| *C08L 79/08* | (2006.01) | |
| *C08L 83/04* | (2006.01) | |
| *C08L 83/06* | (2006.01) | |
| *G02F 1/1337* | (2006.01) | |

(52) U.S. Cl.
CPC ........ *C09K 19/56* (2013.01); *G02F 1/133723* (2013.01)

(58) Field of Classification Search
CPC ......... C09K 19/56; C08L 79/08; C08L 83/04; C08L 83/06
USPC ................ 525/423, 431, 474; 428/1.23, 1.26
See application file for complete search history.

(56) References Cited

U.S. PATENT DOCUMENTS

2016/0168467 A1*  6/2016  Chiou ................... C09K 19/56
                                                                523/400

FOREIGN PATENT DOCUMENTS

| JP | 9-176651 | 7/1997 | |
|---|---|---|---|
| JP | 2011-242427 A | * 12/2011 | ........... G02F 1/1337 |
| TW | 201001029 | 1/2010 | |
| TW | 201130889 | 9/2011 | |
| TW | 201233701 | 8/2012 | |

OTHER PUBLICATIONS

Machine translation of JP 2011-242427 A (no date).*

* cited by examiner

*Primary Examiner* — Michael J Feely
(74) *Attorney, Agent, or Firm* — Nixon & Vanderhye P.C.

(57) ABSTRACT

A liquid crystal alignment agent contains a polymer composition, a polysiloxane, and a solvent. The polymer composition is obtained by subjecting a mixture including a tetracarboxylic dianhydride component and a diamine component to a reaction. The diamine component includes first and second diamine compounds. The polysiloxane contains an epoxy-based group. A liquid crystal display element made from the aforesaid liquid crystal alignment agent has reduced ion density.

8 Claims, 1 Drawing Sheet

LIQUID CRYSTAL ALIGNMENT AGENT AND LIQUID CRYSTAL ALIGNMENT FILM AND LIQUID CRYSTAL DISPLAY ELEMENT FORMED FROM THE LIQUID CRYSTAL ALIGNMENT AGENT

CROSS-REFERENCE TO RELATED APPLICATION

This application claims priority of Taiwanese Application No. 103143295, filed on Dec. 11, 2014.

FIELD

The disclosure relates to a liquid crystal alignment agent, more particularly to a liquid crystal alignment agent for forming a liquid crystal alignment film having low ion density. The disclosure also relates to the liquid crystal alignment film formed from the liquid crystal alignment agent, and a liquid crystal display element including the liquid crystal alignment film.

BACKGROUND

With the increase in requirement for the display quality of a liquid crystal display device, liquid crystal display elements are being developed toward high performance. Liquid crystal displays have been developed from TN, STN to IPS, VA, PSA, and other types. Based on different displaying principles, different pretilt angles are required for a variety of the liquid crystal displays. However, in order to obtain better display quality, one common requirement for various types of the liquid crystal display devices is to have good liquid crystal alignment property. Therefore, the liquid crystal alignment property of a liquid crystal alignment agent is an important research subject affecting the display quality of the liquid crystal display devices.

JP H09-176651 discloses a liquid crystal alignment agent used for forming a liquid crystal alignment film having good pretilt angle stability. The liquid crystal alignment agent includes a polymer obtained by subjecting a tetracarboxylic dianhydride compound having a steroid skeleton and a diamine compound having a steroid skeleton to a reaction. The liquid crystal alignment film can be maintained at a certain pretilt angle under high temperature to achieve a good liquid crystal alignment property. However, the liquid crystal alignment film has a problem of high ion density, especially after a period of exposure to ultraviolet (UV) irradiation, and therefore cannot be accepted by the industry.

There is an increasing demand in the art for a liquid crystal alignment agent to have superior UV stability so that a low ion density of a liquid crystal display element employing a liquid crystal alignment film formed from the liquid crystal alignment agent can be maintained even after long-term UV irradiation.

SUMMARY

Therefore, an object of the disclosure is to provide a liquid crystal alignment agent for forming a liquid crystal alignment film having low ion density.

Another object of the disclosure is to provide the liquid crystal alignment film formed from the liquid crystal alignment agent.

A further object of the disclosure is to provide a liquid crystal display element which includes the liquid crystal alignment film, and which has a low ion density that can be maintained after long-term UV irradiation.

According to a first aspect of the disclosure, there is provided a liquid crystal alignment agent which includes a polymer composition, a polysiloxane, and a solvent.

The polymer composition is obtained by subjecting a tetracarboxylic dianhydride component and a diamine component to a reaction.

The diamine component includes a first diamine compound and a second diamine compound.

The first diamine compound is represented by formula (I):

$$H_2N-\phantom{}-\phantom{}-R^{11}-R^{12}-R^{13}-R^{14}-X \qquad (I)$$
$$H_2N-\phantom{}$$

where
$R^{12}$ and $R^{14}$ are independently selected from the group consisting of $$-O-, \quad -S-, \quad -\overset{O}{\underset{\|}{C}}-O-, \quad -O-\overset{O}{\underset{\|}{C}}-,$$
$$-\overset{O}{\underset{\|}{C}}-S-, \quad \text{and} \quad -S-\overset{O}{\underset{\|}{C}}-,$$

$R^{13}$ represents a $C_2$-$C_{10}$ alkylene group,
$R^{11}$ is selected from the group consisting of a single bond, methylene, and ethylene, and
X represents a $C_{17}$-$C_{40}$ monovalent organic group having a steroid skeleton.

The second diamine compound is represented by formula (II):

$$H_2N-\phantom{}-\phantom{}-R^{15}-R^{16} \qquad (II)$$
$$H_2N-\phantom{}$$

where
$R^{15}$ is selected from the group consisting of $$-O-, \quad -\overset{O}{\underset{\|}{C}}-O-, \quad -O-\overset{O}{\underset{\|}{C}}-,$$
$$-\overset{H}{\underset{}{N}}-\overset{O}{\underset{\|}{C}}-, \quad -\overset{O}{\underset{\|}{C}}-\overset{H}{\underset{}{N}}-, \quad \text{and} \quad -\overset{O}{\underset{\|}{C}}-,$$

and
$R^{16}$ represents an organic group of formula (II-1)

$$\left[\left\{\underset{(R^{17})_k}{\phantom{-}}\right\}(R^{18})_l\right]_p \left[(R^{19})_m-\phantom{}-(R^{20})_n\right]_q (R^{21})_o-R^{22} \qquad (II-1)$$

where each $R^{17}$ is independently selected from the group consisting of hydrogen, fluorine, and methyl, each of $R^{18}$, $R^{19}$ and $R^{20}$ is independently selected from the group consisting of a single bond,

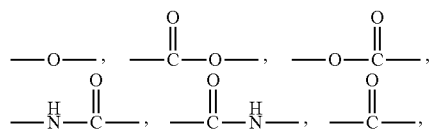

and a $C_1$-$C_3$ alkylene, each $R^{21}$ is independently selected from the group consisting of

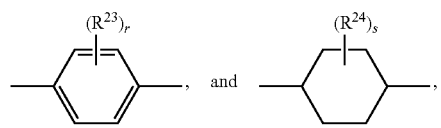

where each of $R^{23}$ and $R^{24}$ is independently selected from the group consisting of hydrogen, fluorine, and methyl, $R^{22}$ is selected from the group consisting of hydrogen, fluorine, a $C_1$-$C_{12}$ alkyl group, a $C_1$-$C_{12}$ fluoroalkyl group, a $C_1$-$C_{12}$ alkoxyl group, —OCH$_2$F'—OCHF$_2$, and —OCF$_3$, k is an integer ranging from 1 to 2, each of l, m, and n is independently an integer ranging from 0 to 4, each of o, p, and q is independently an integer ranging from 0 to 3 with the proviso that the sum of o, p, and q is equal to or greater than 3, and each of r and s is independently an integer ranging from 1 to 2.

The polysiloxane contains an epoxy-based group. The epoxy-based group of the polysiloxane is includes functional groups of formula (B-1), formula (B-2), formula (B-3), and the combinations thereof,

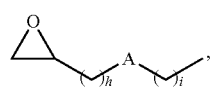 (B-1)

where

A is selected from the group consisting of oxygen and a single bond, h is an integer ranging from 1 to 3, and i is an integer ranging from 0 to 6 with the proviso that A is a single bond when i is 0,

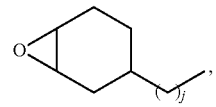 (B-2)

where j is an integer ranging from 0 to 6

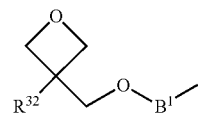 (B-3)

where $B^1$ represents a $C_2$-$C_6$ alkylene group, and $R^{32}$ represents a hydrogen atom or a $C_1$-$C_6$ alkyl group.

According to a second aspect of the disclosure, there is provided a liquid crystal alignment film formed from the liquid crystal alignment agent.

According to a third aspect of the disclosure, there is provided a liquid crystal display element including the liquid crystal alignment film.

BRIEF DESCRIPTION OF THE DRAWING

Other features and advantages of the disclosure will become apparent in the following detailed description of the embodiments with reference to the accompanying drawing, of which.

DETAILED DESCRIPTION

Liquid Crystal Alignment Agent

Figure 1:
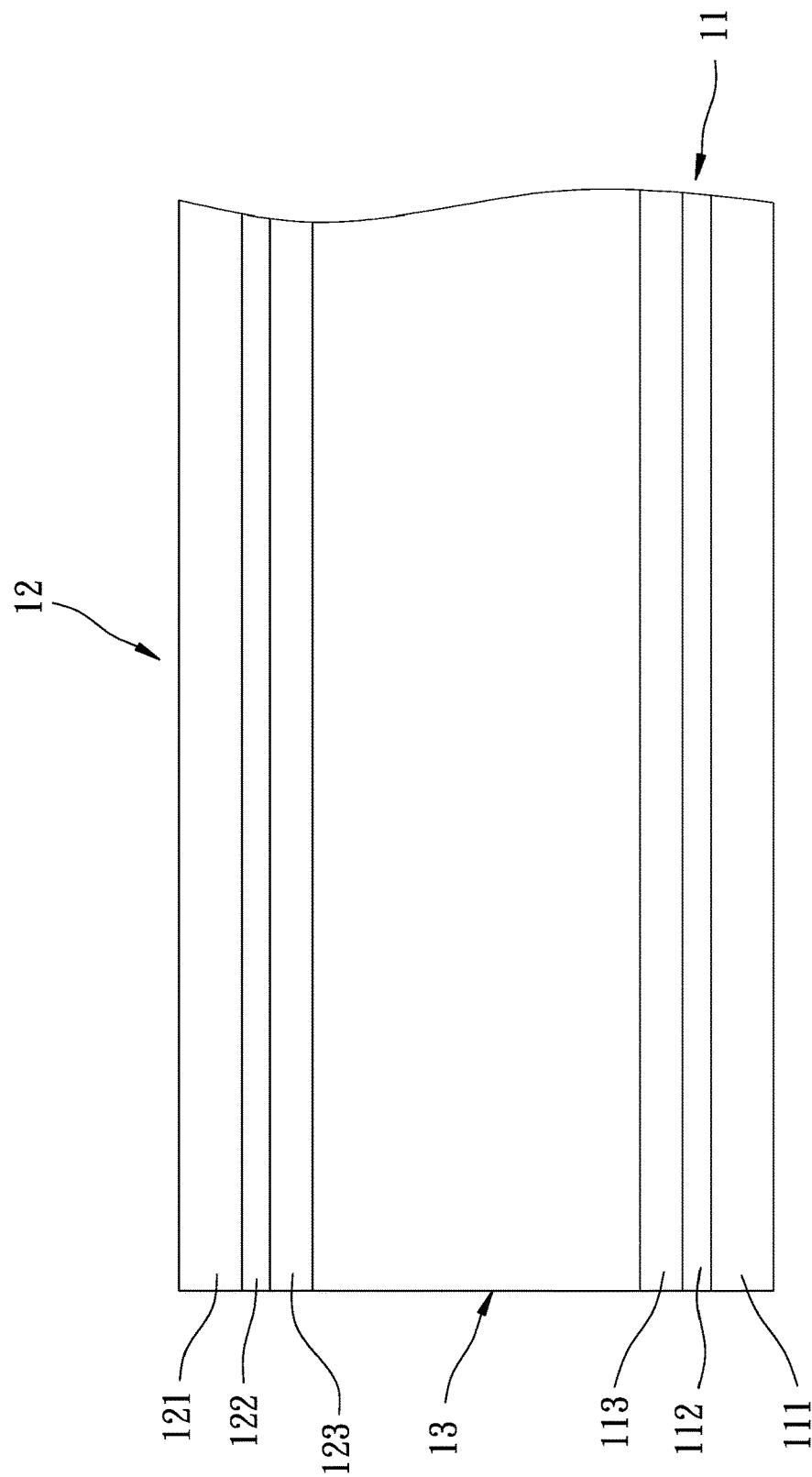
FIG. 1 is a fragmentary schematic view of an embodiment of a liquid crystal display element according to the disclosure.

The liquid crystal alignment agent of the disclosure includes a polymer composition, a polysiloxane, and a solvent.

Polymer Composition:

The polymer composition is obtained by subjecting a mixture containing a tetracarboxylic dianhydride component and a diamine component to a reaction.

Tetracarboxylic Dianhydride Component:

The tetracarboxylic dianhydride component includes at least one tetracarboxylic dianhydride compound selected from the group consisting of an aliphatic tetracarboxylic dianhydride compound, an alicyclic tetracarboxylic dianhydride compound, an aromatic tetracarboxylic dianhydride compound, a teracarboxylic dianhydride compound of formulas (A-1)-(A-6), and combinations thereof,

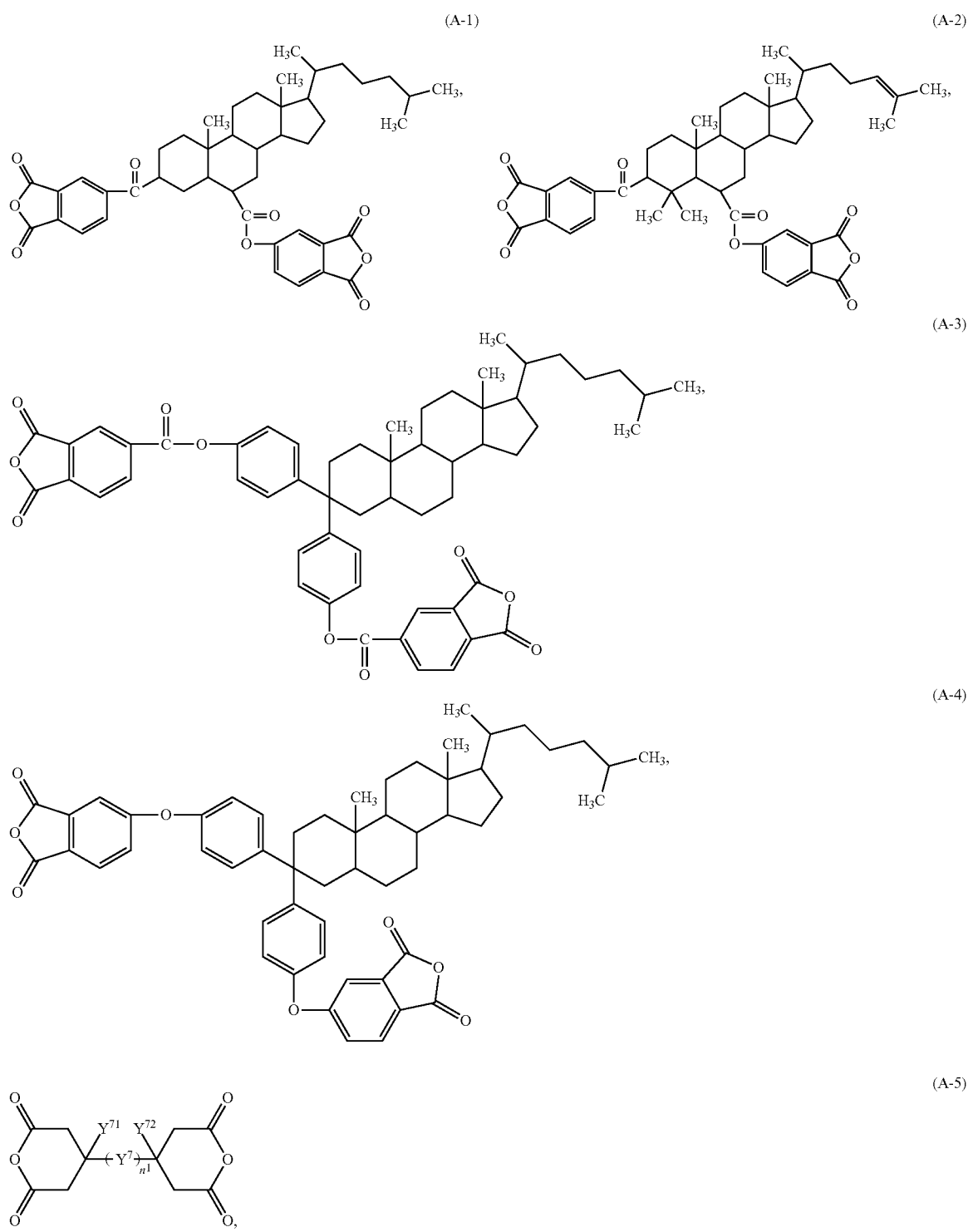
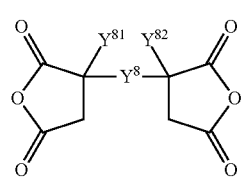
where
$Y^7$ represents a divalent group having an aromatic ring structure,
$n^1$ represents an integer ranging from 1 to 2, and
$Y^{71}$ and $Y^{72}$ may be the same or different, and independently represent hydrogen or an alkyl group, and where Y⁸ represents a divalent group having an aromatic ring structure, and $Y^{81}$ and $Y^{82}$ may be the same or different, and independently represent hydrogen or an alkyl group.

The aforesaid tetracarboxylic dianhydride compounds can be used alone or as a mixture of two or more.

Examples of the aliphatic tetracarboxylic dianhydride compound include, but are not limited to, ethanetetracarboxylic dianhydride and butanetetracarboxylic dianhydride.

Examples of the alicyclic tetracarboxylic dianhydride compound include, but are not limited to, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutane tetracarboxylic dianhydride, 1,2,3,4-cyclopentane tetracarboxylic dianhydride, 1,2,4,5-cyclohexane tetracarboxylic dianhydride, 3,3',4,4'-dicyclohexane tetracarboxylic dianhydride, cis-3,7-dibutylcycloheptyl-1,5-diene-1,2,5,6-tetracarboxylic dianhydride, 2,3,5-tricarboxylcyclopentylacetic dianhydride, and bicyclo[2.2.2]-octa-7-ene-2,3,5,6-tetracarboxylic dianhydride.

Examples of the aromatic tetracarboxylic dianhydride compound include, but are not limited to, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylicdianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid) phenylphosphine oxide dianhydride, p-phenylene-bis(triphenylphthalic acid)dianhydride, m-phenylene-bis(triphenylphthalic acid)dianhydride, bis(triphenylphthalic acid)-4,4'-diphenyl ether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3,-dione, 1,3,3a,4,5,9b-hexahydro-7-ethyl-5-(tetrahydro-2,5-dioxo-3-furanyl)-naphtho[1,2-c]-furan-1,3,-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, and 5-(2,5-dioxotetrahydrofuranyl)-3-methyl-3-cyclohexene-1,2-dicarboxylic dianhydride.

Preferably, the tetracarboxylic dianhydride compound represented by formula (A-5) is selected from

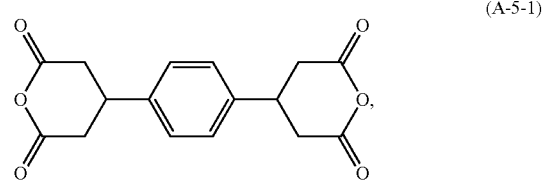
(A-5-1)

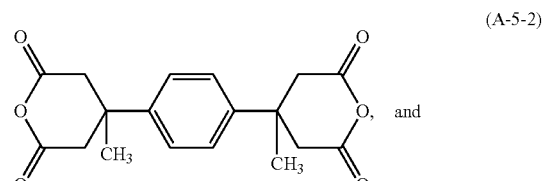
(A-5-2)
and

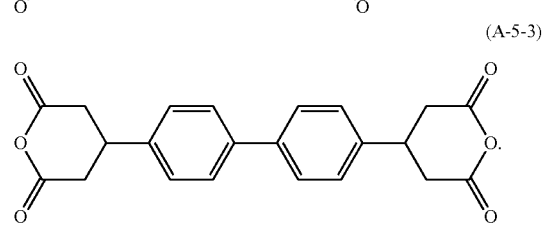
(A-5-3).

Preferably, the tetracarboxylic dianhydride compound represented by formula (A-6) is

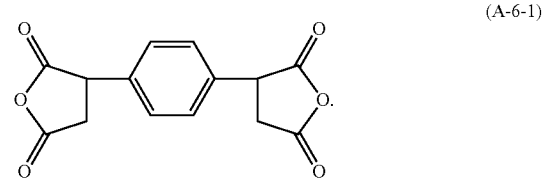
(A-6-1).

Preferred examples of the tetracarboxylic dianhydride compound suitable for the disclosure include, but are not limited to, 1,2,3,4-cyclobutane tetracarboxylic dianhydride, 1,2,3,4-cyclopentanetetracarboxylic dianhydride, 2,3,5-tricarboxycyclopentylacetic dianhydride, 1,2,4,5-cyclohexanetetracarboxylic dianhydride, 3,4-dicarboxy-1,2,3,4-tetrahydronaphthalene-1-succinic acid dianhydride, pyromelliticdianhydride, 3,3',4,4'-benzophenonetetracarboxylic dianhydride, 3,3',4,4'-biphenylsulfonetetracarboxylic dianhydride, and combinations thereof.

Diamine Component:

The diamine component includes a first diamine compound, a second diamine compound, and another diamine compound other than the first and second diamine compounds.

First Diamine Compound:

The first diamine compound is represented by Formula (I):

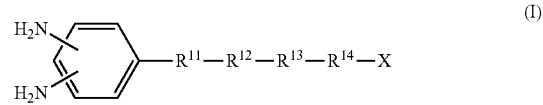
(I)

where $R^{12}$ and $R^{14}$ are independently selected from the group consisting of

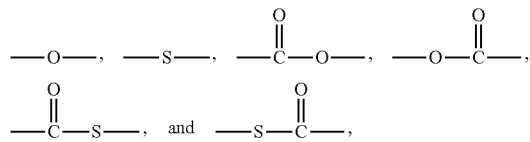

$R^{13}$ represents a $C_2$-$C_{10}$ alkylene group, $R^{11}$ is selected from the group consisting of a single bond, methylene, and ethylene, and X represents a $C_{17}$-$C_{40}$ monovalent organic group having a steroid skeleton.

The steroid skeleton is a cyclopentano-perhydro phenanthrene skeleton. One or more carbon-carbon bonds in the steroid skeleton may be double bond.

Examples of the steroid skeleton include, but are not limited to the following formulas (X-1)-(X-4), (X-1)
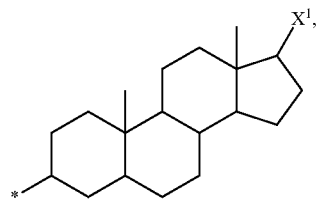

(X-2)
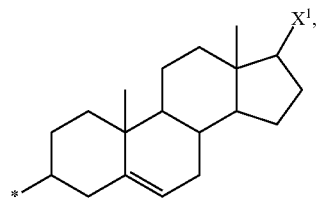

(X-3)
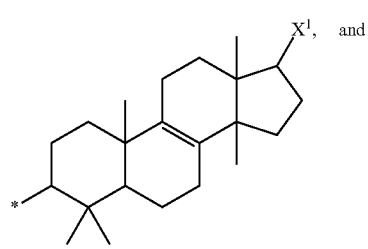

(X-4)
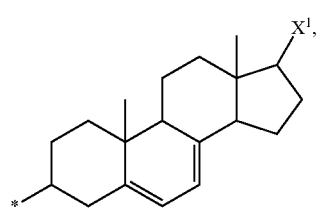

where $X^1$ is independently selected from the group consisting of (X¹-1)

(X¹-2)
, and (X¹-3)

+ and * are independently represent a binding bond.

Examples of the X in Formula (I) include, but are not limited to the following formulas (X-1-1)-(X-1-4), (X-1-1)
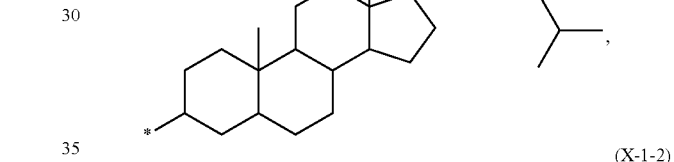

(X-1-2)
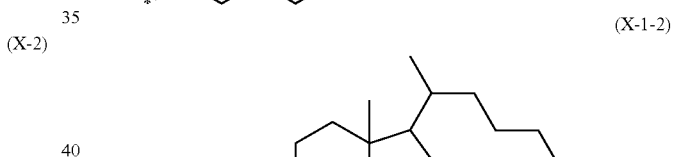

(X-1-3)
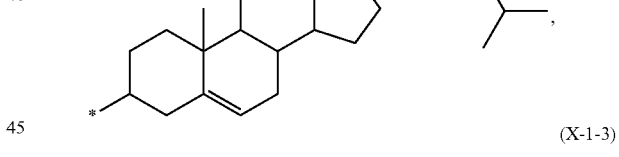
, and (X-1-4)
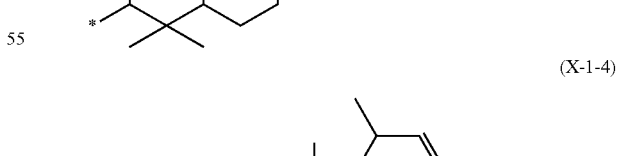

where
* represents a binding bond.
Examples of the first diamine compound include, but are not limited to diamine compounds of the following formulas (I-1)-(I-29),
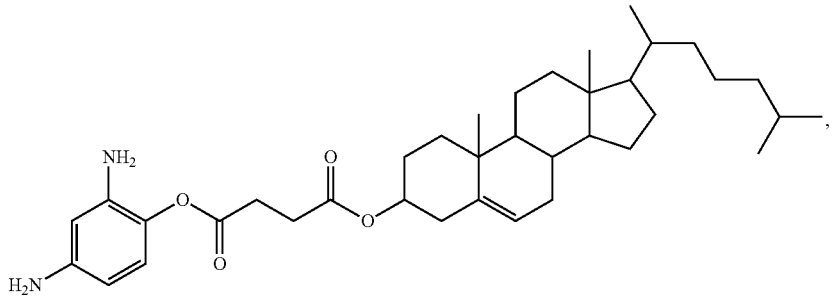
(I-1)
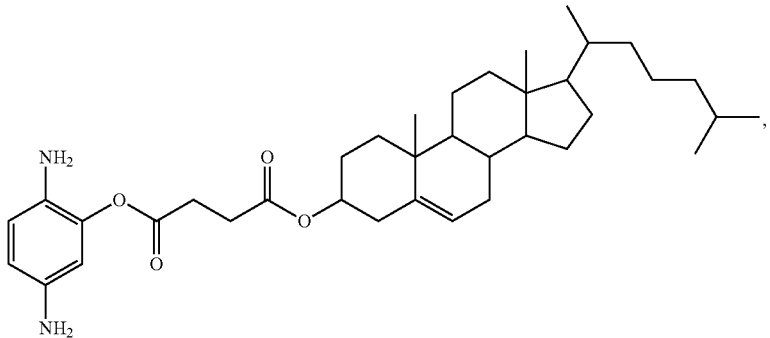
(I-2)
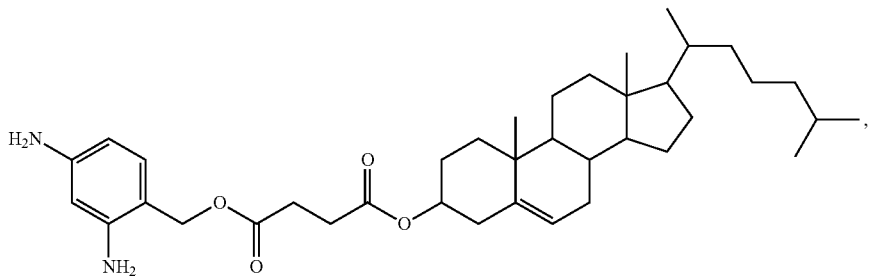
(I-3)
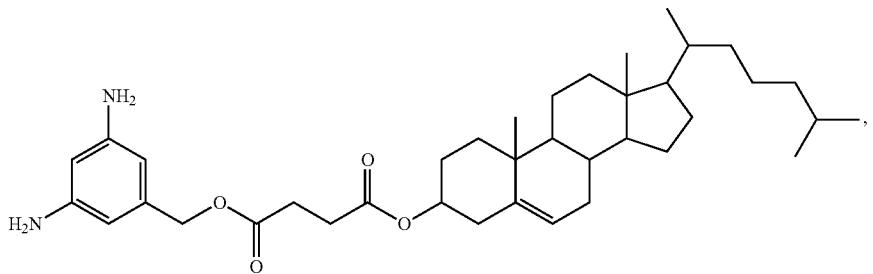
(I-4)
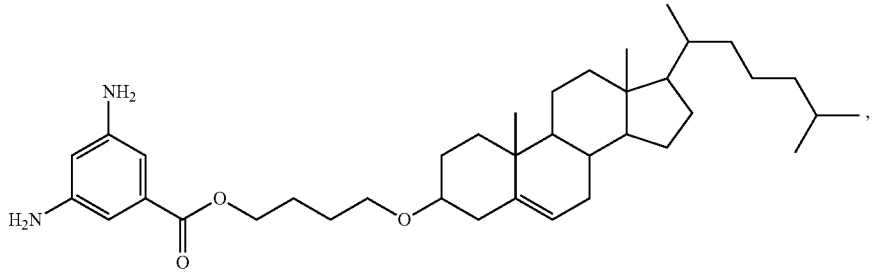
(I-5)

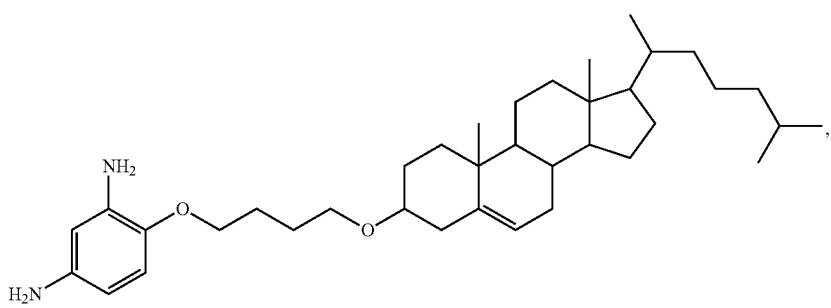
(I-6)
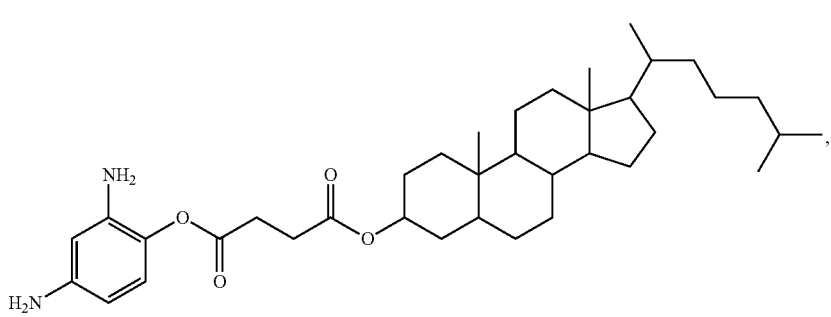
(I-7)
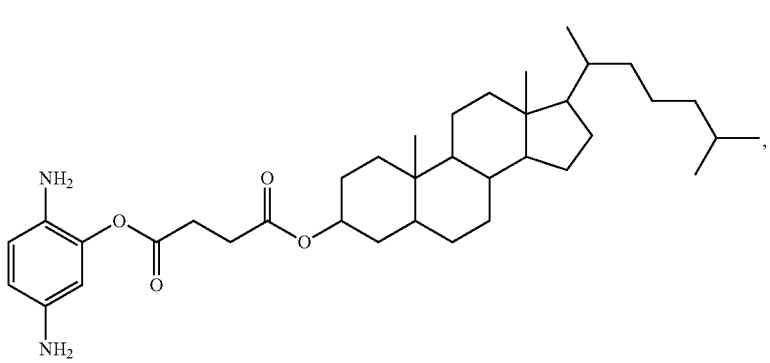
(I-8)
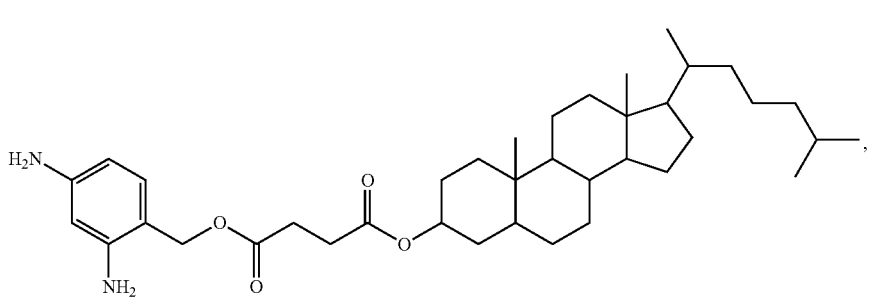
(I-9)
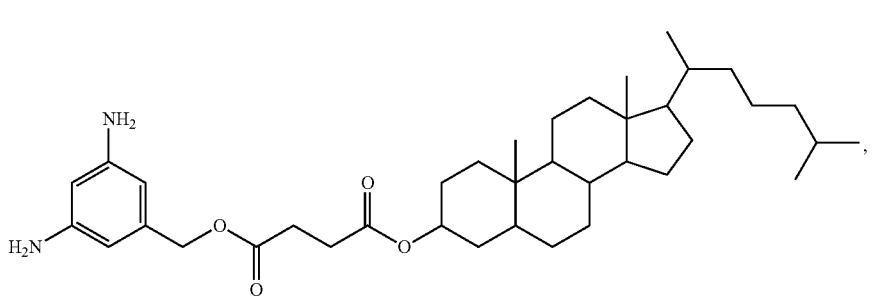
(I-10)

-continued
(I-11)
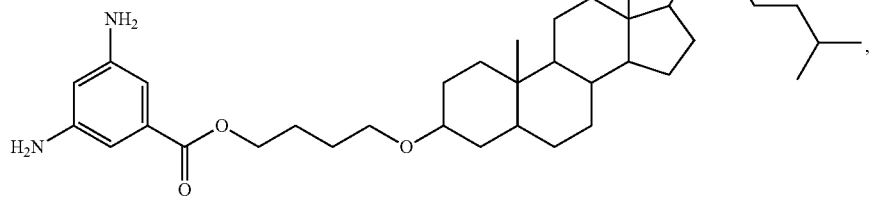
(I-12)
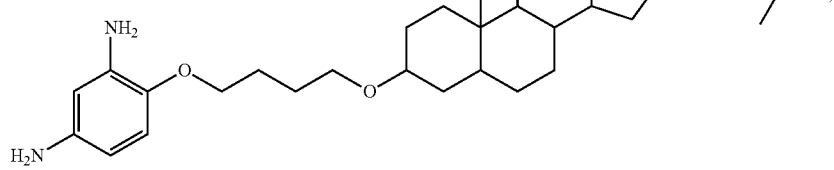
(I-13)
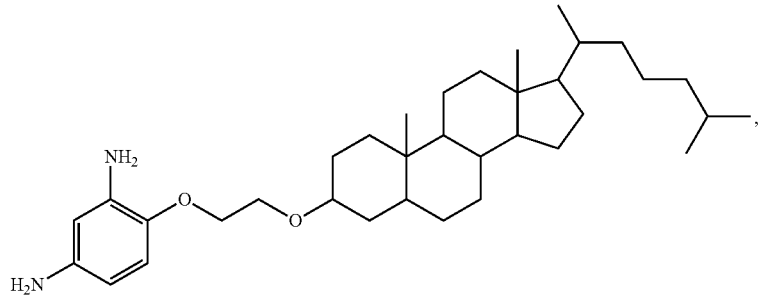
(I-14)
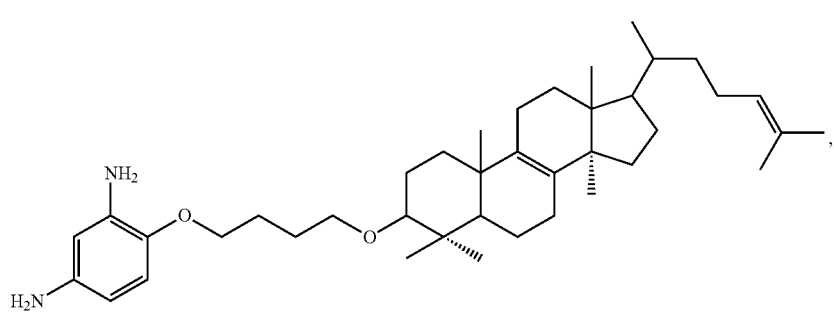
(I-15)
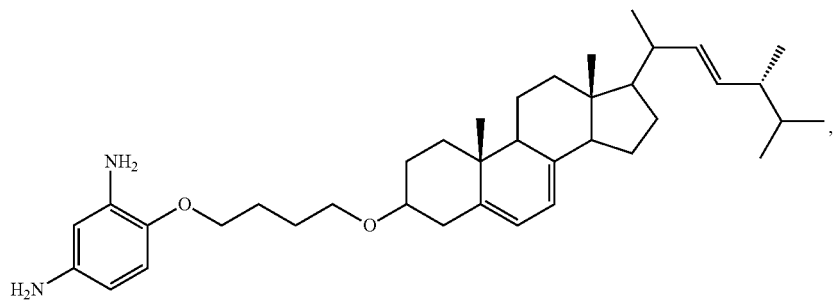

(I-16)
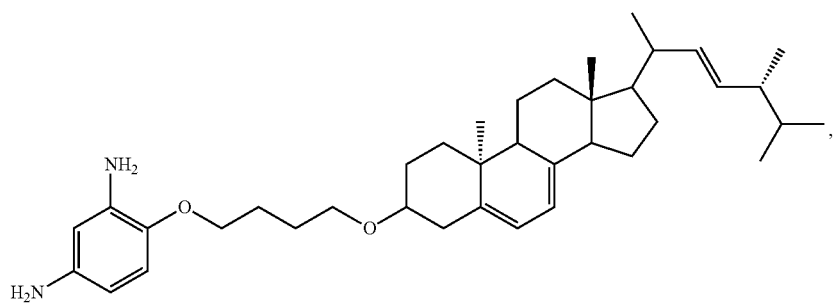
(I-17)
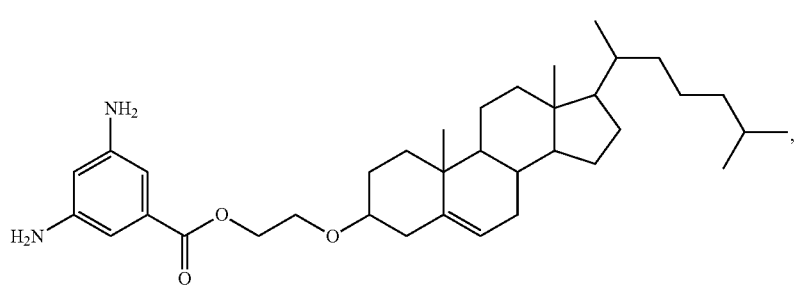
(I-18)
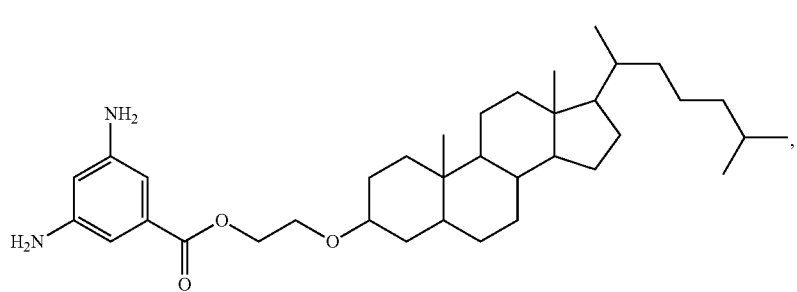
(I-19)
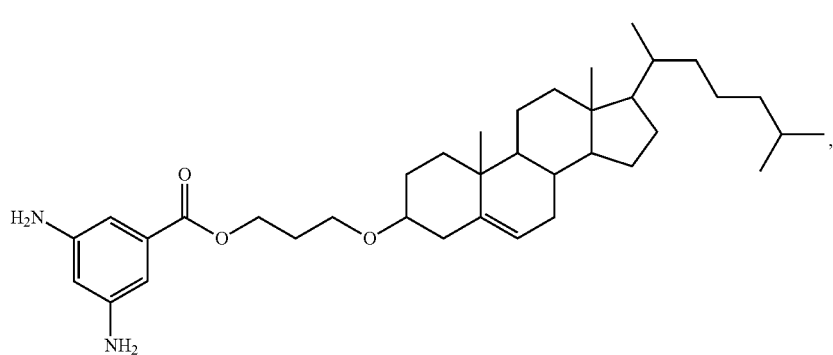
(I-20)
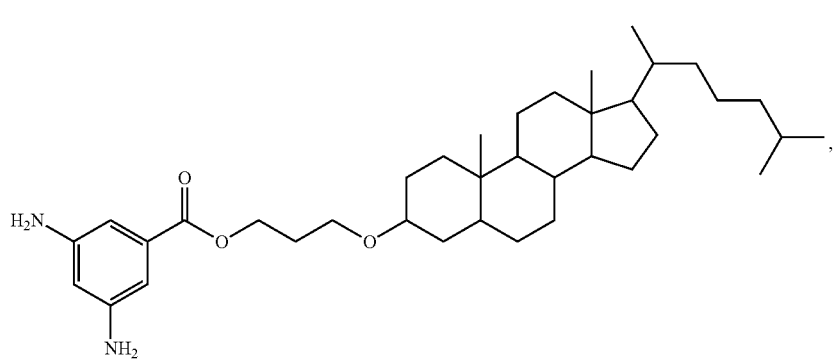

-continued
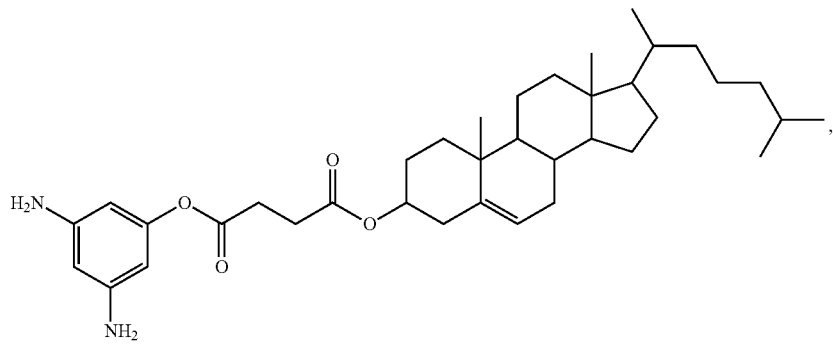
(I-21)
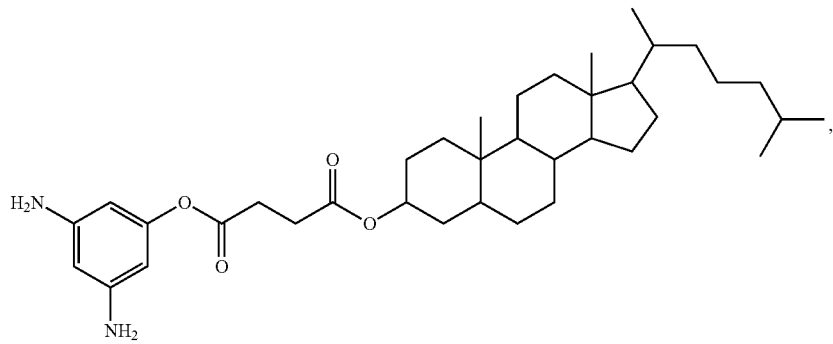
(I-22)
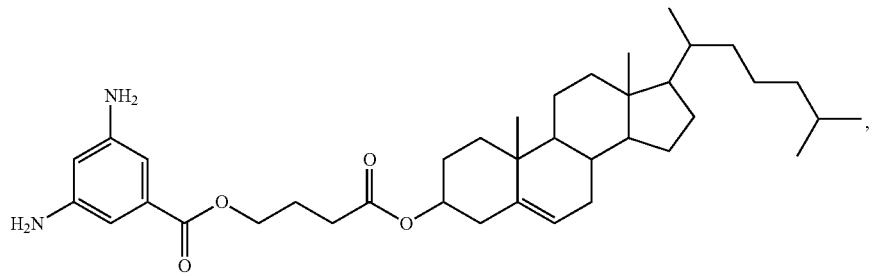
(I-23)
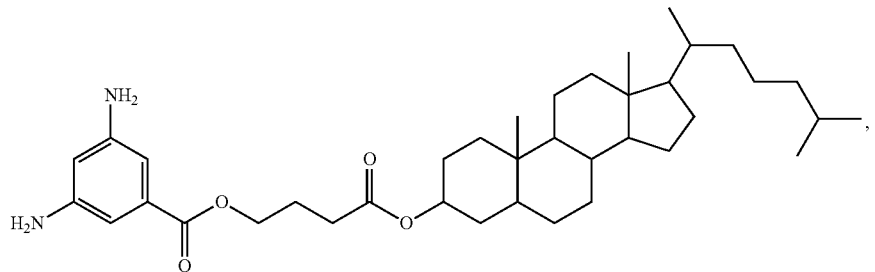
(I-24)
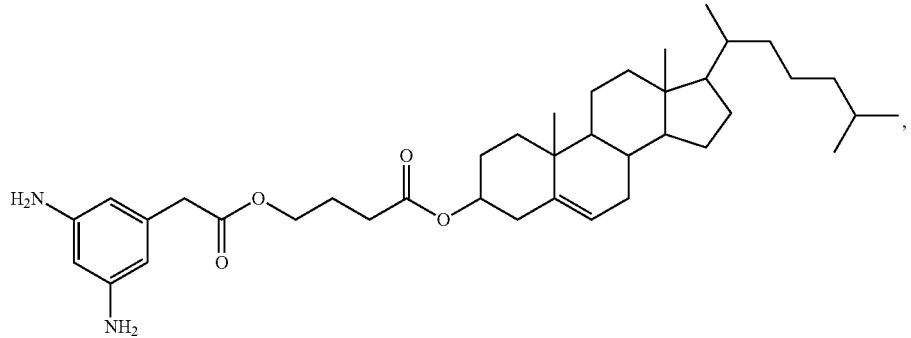
(I-25)

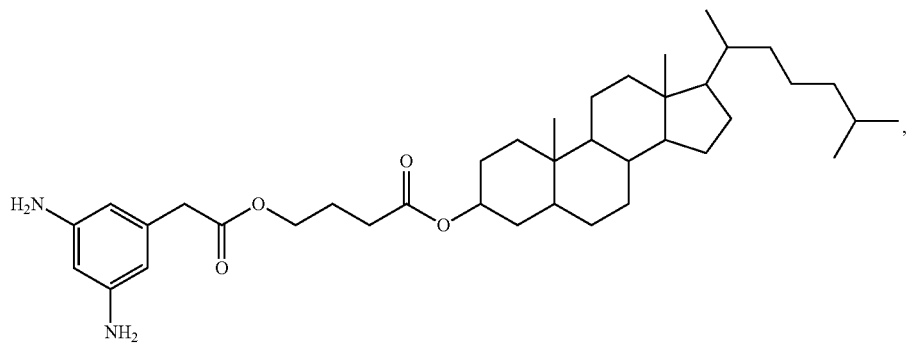
(I-26)
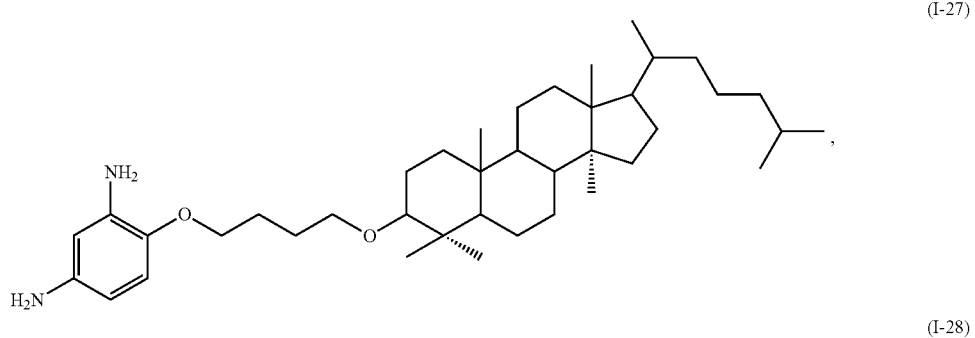
(I-27)
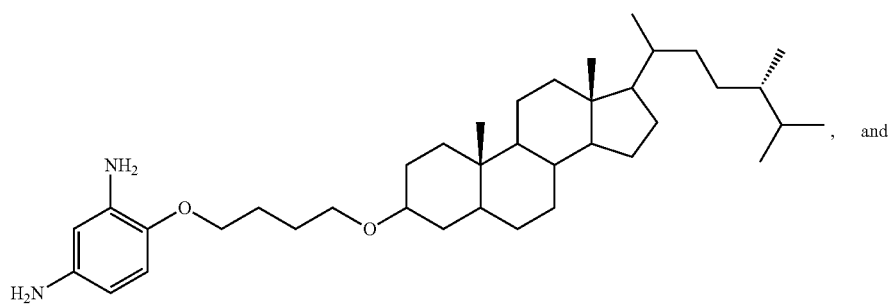
(I-28), and
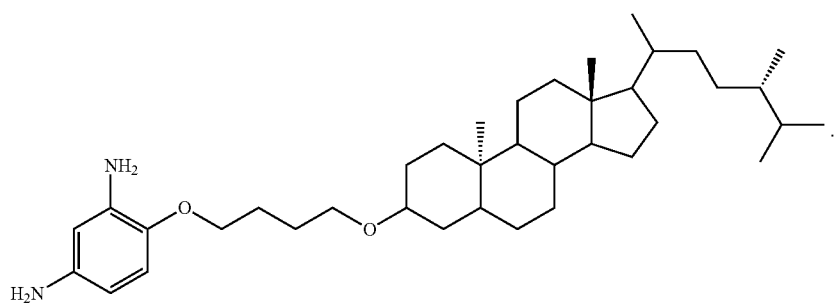
(I-29).
Second Diamine Compound:
The second diamine compound is represented by Formula (II):
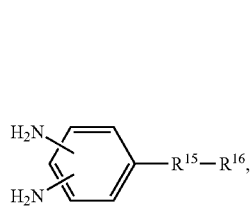
(II)
where $R^{15}$ is selected from the group consisting of
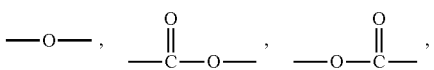
and and $R^{16}$ represents an organic group of formula (II-1)

(II-1)

$$\left[\left[\begin{array}{c}(R^{17})_k\\ \phantom{X}\end{array}\right]_l(R^{18})_l\right]_p(R^{19})_m\text{—}\bigcirc\text{—}(R^{20})_n\Big]_q(R^{21})_o\text{—}R^{22}$$

where each $R^{17}$ is independently selected from the group consisting of hydrogen, fluorine, and methyl, each of $R^{18}$, $R^{19}$ and $R^{20}$ is independently selected from the group consisting of a single bond, —O—, $-\overset{O}{\underset{\parallel}{C}}-O-$, $-O-\overset{O}{\underset{\parallel}{C}}-$, $-\overset{H}{\underset{|}{N}}-\overset{O}{\underset{\parallel}{C}}-$, $-\overset{O}{\underset{\parallel}{C}}-\overset{H}{\underset{|}{N}}-$, $-\overset{O}{\underset{\parallel}{C}}-$, and a $C_1$-$C_3$ alkylene, each $R^{21}$ is independently selected from the group consisting of $(R^{23})_r$ , and $(R^{24})_s$ , where each of $R^{23}$ and $R^{24}$ is independently selected from the group consisting of hydrogen, fluorine, and methyl, $R^{22}$ is selected from the group consisting of hydrogen, fluorine, a $C_1$-$C_{12}$ alkyl group, a $C_1$-$C_{12}$ fluoroalkyl group, a $C_1$-$C_{12}$ alkoxyl group, —OCH$_2$F'—OCHF$_2$, and —OCF$_3$, k is an integer ranging from 1 to 2, each of l, m, and n is independently an integer ranging from 0 to 4, each of o, p, and q is independently an integer ranging from 0 to 3 with the proviso that the sum of o, p, and q is equal to or greater than 3, and each of r and s is independently an integer ranging from 1 to 2.

Examples of the second diamine compound represented by formula (II) include, but are not limited to diamine compounds of formulas (II-2)-(II-9), (II-2)

[Chemical structure of compound II-2]

(II-3)

[Chemical structure of compound II-3]

(II-4)

[Chemical structure of compound II-4]

(II-5)

[Chemical structure of compound II-5]

(II-6)

[Chemical structure of compound II-6]

(II-7)

[Chemical structure of compound II-7]

(II-8)

[Chemical structure of compound II-8], and (II-9)

[Chemical structure of compound II-9], where $R^{25}$ is preferably selected from the group consisting of hydrogen, a $C_1$-$C_{12}$ alkyl group, and a $C_1$-$C_{12}$ alkoxyl group.

Preferably, the second diamine compound represented by formula (II) is selected from the group consisting of diamine compounds of formulas (II-10) to (II-14), (II-10)

[Chemical structure of compound II-10],

-continued (II-11)
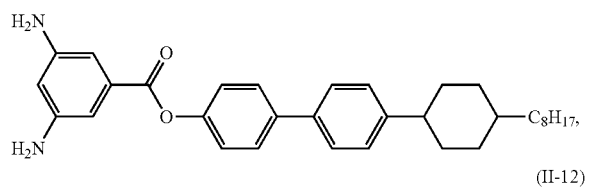

(II-12)
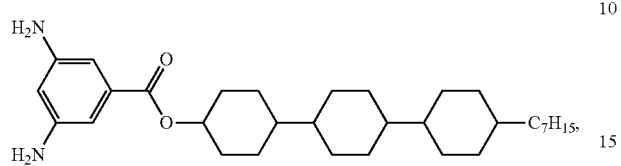

(II-13)
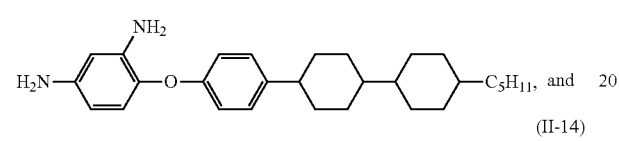, and (II-14)
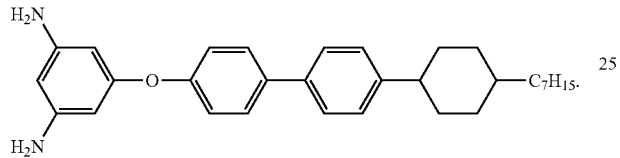.

The aforementioned examples of the second diamine compound of formula (II) can be used alone or in admixture.

When the diamine component for obtaining the polymer composition for the liquid crystal alignment agent does not contain both the first and second diamine compounds represented by formulas (I) and (II), the liquid crystal display element including the liquid crystal alignment film formed from the liquid crystal alignment agent has high ion density.

Another Diamine Compound:

Examples of another diamine compound other than the first and second diamine compounds of formula (I) and (II) include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, 1,2-bis(3-aminopropoxy)ethane, 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadienylene diamine, tricyclic [6.2.1.02,7]-undecylenedimethylene diamine, 4,4'-methylenebis(cyclohexylamine), 4,4'-diaminodiphenylmethane, 4,4'-diaminodiphenylethane, 4,4'-diaminodiphenylsulfone, 4,4'-diaminobenzanilide, 4,4'-diaminodiphenylether, 3,4'-diaminodiphenylether, 1,5-diaminonaphthalene, 5-amino-1-(4'-aminophenyl)-1,3,3-trimethylindane, 6-amino-1-(4'-aminophenyl)-1,3,3-trimethylindane, hexahydro-4,7-methanoindanylenedimethylene diamine, 3,3'-diaminobenzophenone, 3,4'-diaminobenzophenone, 4,4'-diaminobenzophenone, 2,2-bis[4-(4-aminophenoxy)phenyl] propane, 2,2-bis[4-(4-aminophenoxy)phenyl] hexafluoropropane, 2,2-bis(4-aminophenyl) hexafluoropropane, 2,2-bis[4-(4-aminophenoxy)phenyl] sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]octafluorobiphenyl, 5-[4-(4-n-pentylcyclohexyl)cyclohexyl]phenylmethylene-1,3-diaminobenzene, 1,1-bis[4-4-aminophenoxy)phenyl]-4-(4-ethylphenyl)cyclohexane, and diamine compounds of formulas (VI-1)-(VI-25), (VI-1)
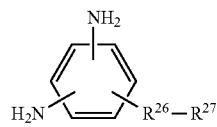

where
$R^{26}$ represents

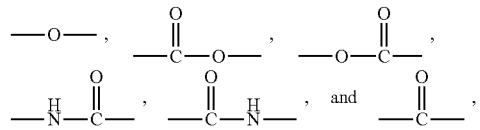

and
$R^{27}$ represents a monovalent group having a group selected from the group consisting of a steroid-containing group, a trifluoromethyl group, a fluoro group, a $C_2$-$C_{30}$ alkyl group, a monovalent nitrogen-containing cyclic structure derived from the group consisting of pyridine, pyrimidine, triazine, piperidine and piperazine, and combinations thereof, (VI-2)
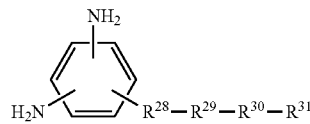

where
$R^{28}$ represents

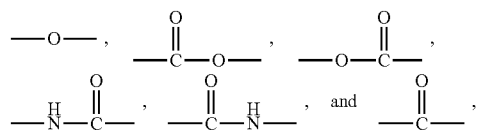

$R^{29}$ and $R^{39}$ independently represent a divalent group which is selected from the group consisting of an alicyclic group, an aromatic group, and a heterocyclic group; and $R^{31}$ represents a $C_3$-$C_{18}$ alkyl group, a $C_3$-$C_{18}$ alkoxy group, a $C_1$-$C_5$ fluoroalkyl group, a $C_1$-$C_5$ fluoroalkoxy group, a cyano group, or a halogen atom,

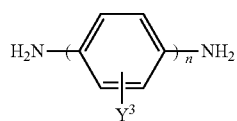
(VI-3)

where $Y^3$ represents hydrogen, a $C_1$-$C_5$ acyl group, a $C_1$-$C_5$ alkyl group, a $C_1$-$C_5$ alkoxy group, or halogen, $Y^3$ in each repeating unit may be the same or different, and n is an integer ranging from 1 to 3,

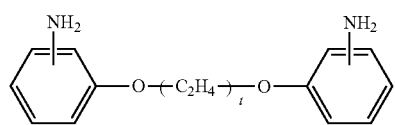
(VI-4)

where t is an integer ranging from 2 to 12,

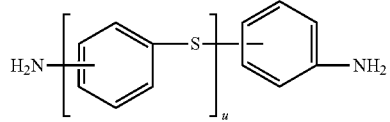
(VI-5)

where u is an integer ranging from 1 to 5,

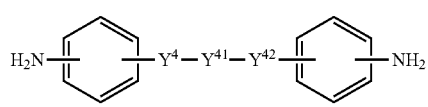
(VI-6)

where $Y^4$ and $Y^{42}$ may be the same or different, and independently represent a divalent organic group; and $Y^{41}$ represents a divalent group that has a ring structure containing a nitrogen atom and that is derived from the group consisting of pyridine, pyrimidine, triazine, piperidine, and piperazine,

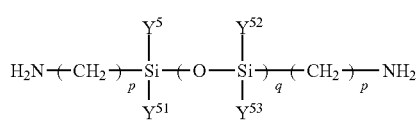
(VI-7)

where $Y^5$, $Y^{51}$, $Y^{52}$, and $Y^{53}$ may be the same or different, and independently represent a $C_1$-$C_{12}$ hydrocarbon group, p is an integer ranging from 1 to 3, and q is an integer ranging from 1 to 20,

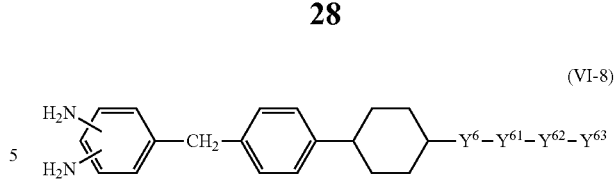
(VI-8)

where $Y^6$ represents —O—, or cyclohexylene, $Y^{61}$ represents —$CH_2$—, $Y^{62}$ represents phenylene, or cyclohexylene, and $Y^{63}$ represents hydrogen, or heptyl,

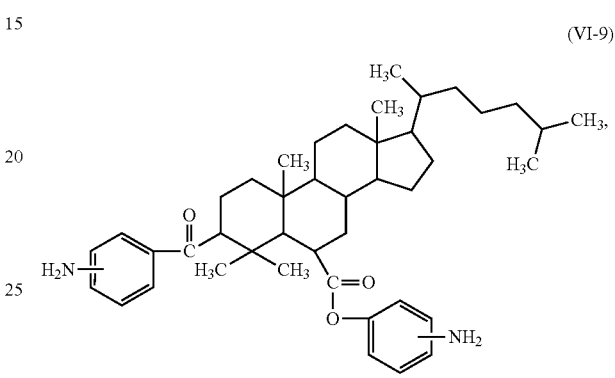
(VI-9)

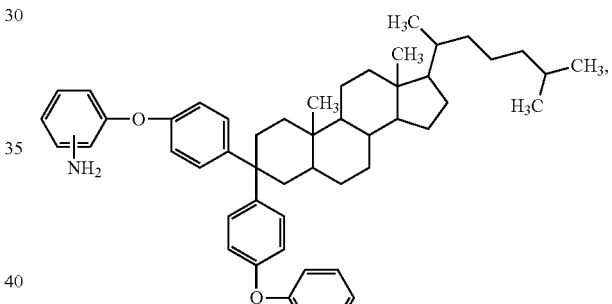
(VI-10)

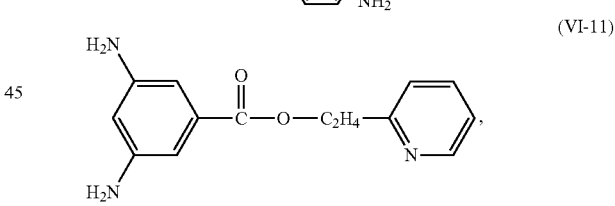
(VI-11)

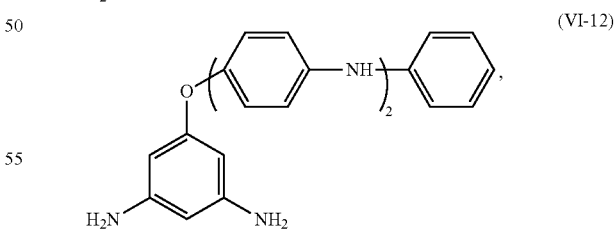
(VI-12)

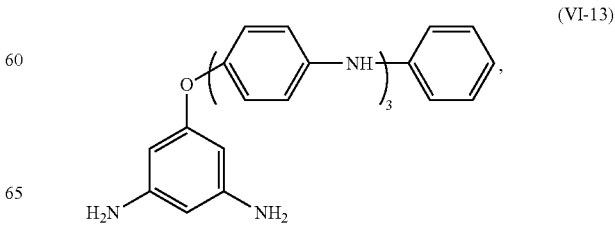
(VI-13)

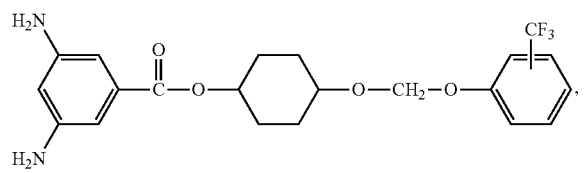
(VI-14)

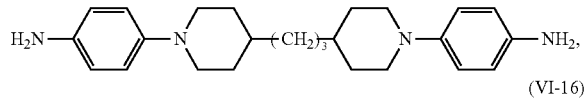
(VI-15)

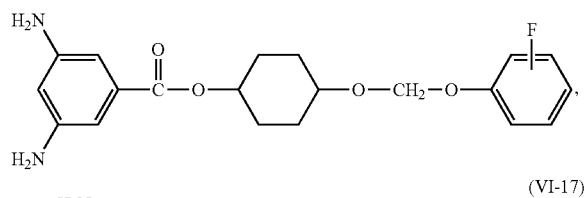
(VI-16)

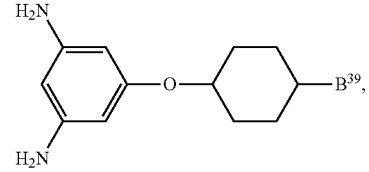
(VI-17)

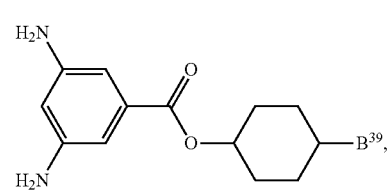
(VI-18)

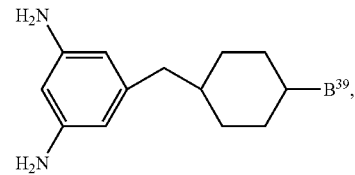
(VI-19)

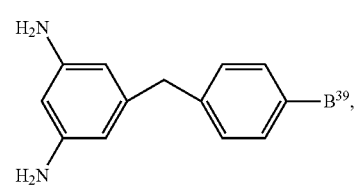
(VI-20)

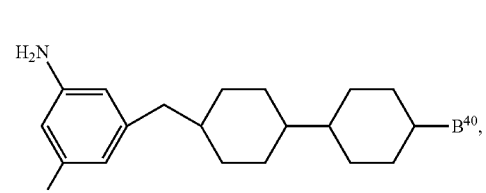
(VI-21)

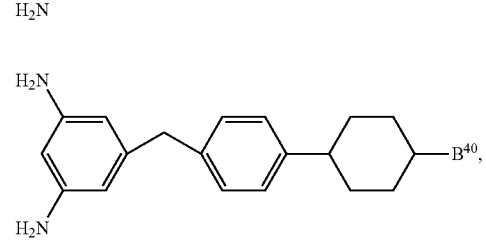
(VI-22)

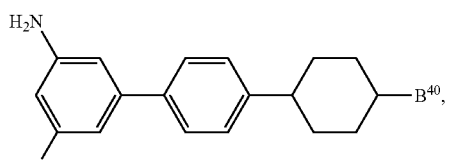
(VI-23)

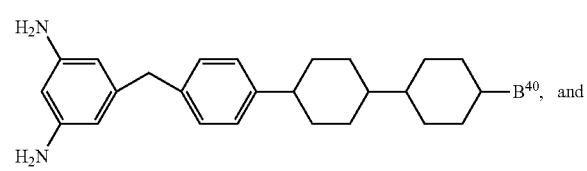
(VI-24)

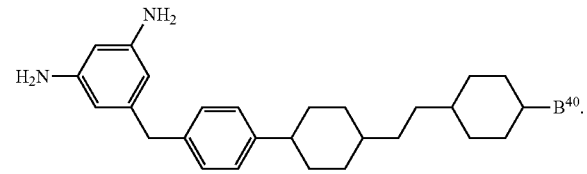
(VI-25)

The aforesaid examples of the another diamine compound can be used alone or in admixture.

Preferred examples of the diamine compounds represented by formula (VI-1) include 2,4-diaminophenyl ethyl formate, 3,5-diaminophenyl ethyl formate, 2,4-diaminophenyl propyl formate, 3,5-diaminophenyl propyl formate, 1-dodecoxy-2,4-diaminobenzene, 1-hexadecoxy-2,4-diaminobenzene, 1-octadecoxy-2,4-diaminobenzene,

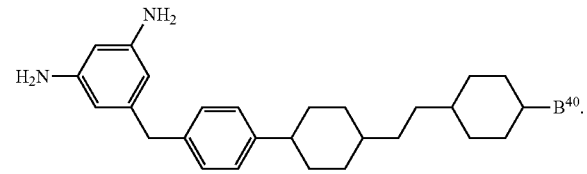
(VI-1-1)

(VI-1-2)

-continued
(VI-1-3)
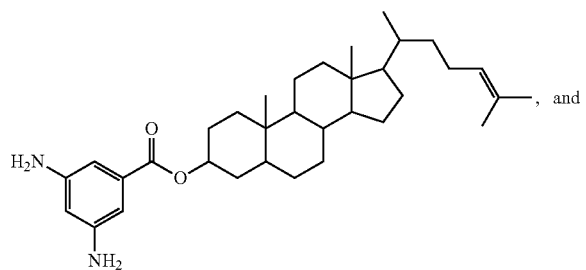
, and
(VI-1-4)
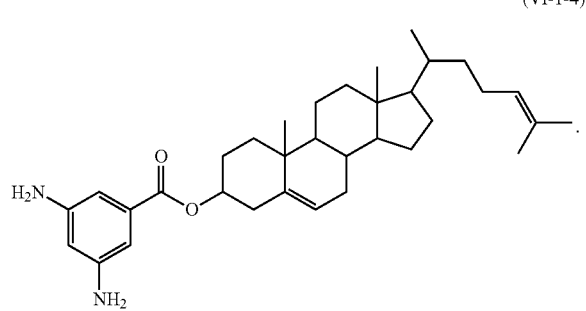
Preferred examples of the diamine compounds represented by formula (VI-2) include
(VI-2-1)
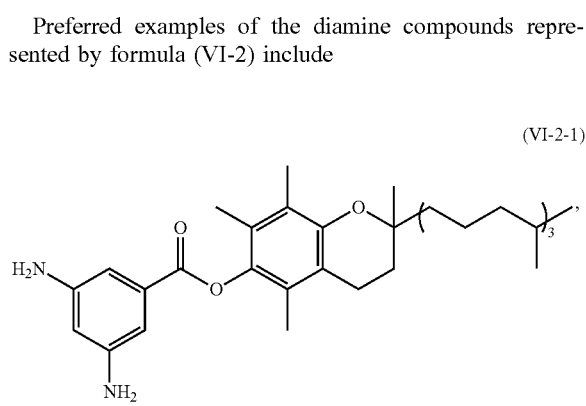
(VI-2-2)
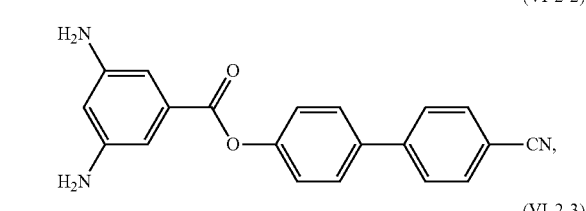
(VI-2-3)
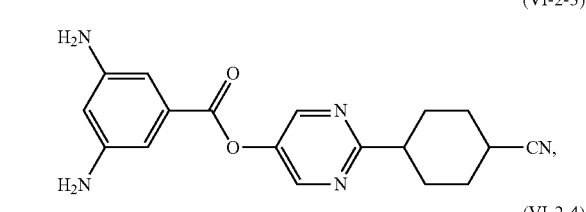
(VI-2-4)
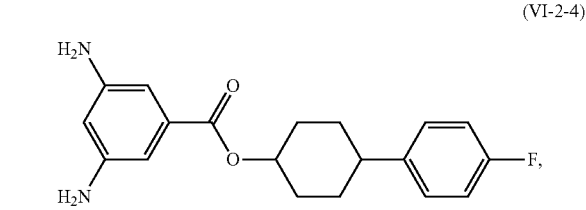
-continued
(VI-2-5)
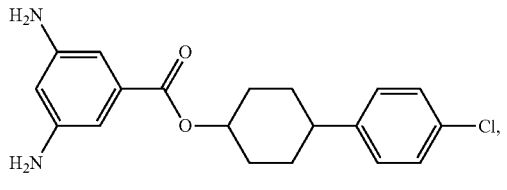
(VI-2-6)
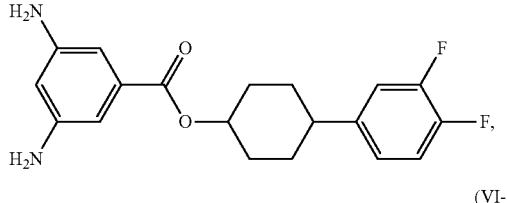
(VI-2-7)
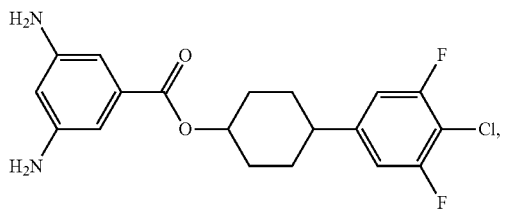
(VI-2-8)
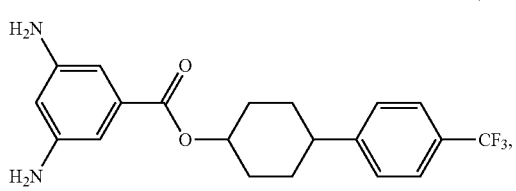
(VI-2-9)
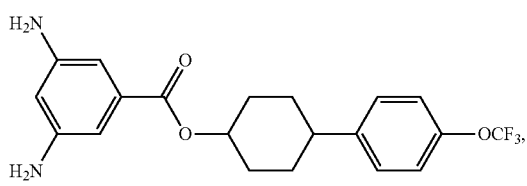
(VI-2-10)
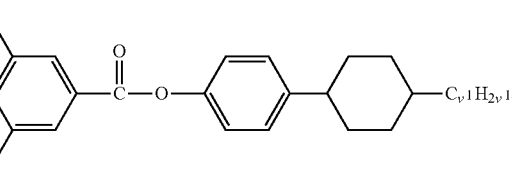
(wherein $v^1$ represents an integer ranging from 3 to 12)
(VI-2-11)
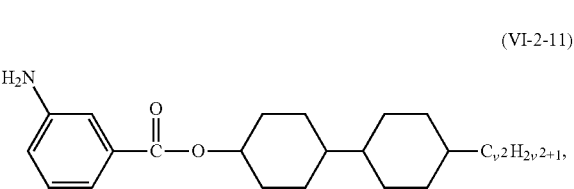
(wherein $v^2$ represents an integer ranging from 3 to 12)

(VI-2-12)

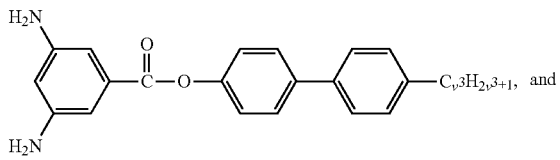

(wherein $v^3$ represents an integer ranging from 3 to 12)

(VI-2-13)

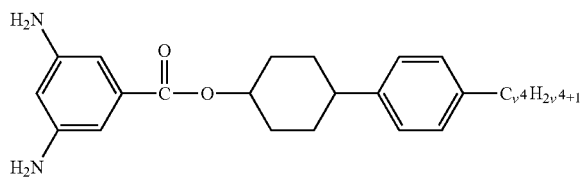

(wherein $v^4$ represents an integer ranging from 3 to 12).

Preferred examples of the diamine compound represented by formula (VI-3) include: (1) p-diaminobenzene, m-diaminobenzene, o-diaminobenzene, 2,5-diaminotoluene, or the like when n is 1; (2) 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethoxybiphenyl, 4,4'-diamino-2,2'-bis(trifluoromethyl)biphenyl, or the like when n is 2; and (3) 1,4-bis(4'-aminophenyl)benzene, or the like when n is 3. More preferably, the diamine compound represented by formula (VI-3) is selected from the group consisting of p-diaminobenzene, 2,5-diaminotoluene, 4,4'-diaminobiphenyl, 3,3'-dimethoxy-4,4'-diaminobiphenyl, 1,4-bis(4'-aminophenyl)benzene, and combinations thereof.

Preferably, the diamine compound represented by formula (VI-5) is 4,4'-diaminodiphenylsulfide.

Preferably, the diamine compound represented by formula (VI-8) is selected from the group consisting of (VI-8-1)

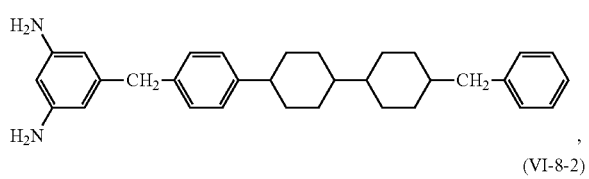

(VI-8-2)

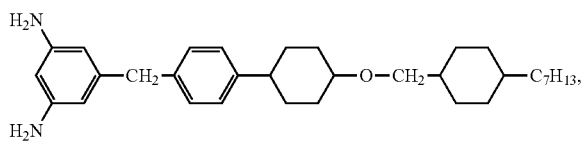

and the combination thereof.

Preferably, $B^{39}$ of the diamine compounds represented by formulas (VI-17) to (VI-20) represents a $C_1$-$C_{10}$ alkyl or a $C_1$-$C_{10}$ alkoxy, and $B^{40}$ of the diamine compounds represented by formulas (VI-21) to (VI-25) represents a $C_1$-$C_{10}$ alkyl or a $C_1$-$C_{10}$ alkoxy.

Preferred examples of the another diamine compound suitable for the disclosure include, but are not limited to, 4,4'-diaminodicyclohexyl methane, 4,4'-diamino-3,3'-dimethyl dicyclohexyl amine, 1,3-diaminodicyclohexane, 1,4-diaminodicyclohexane, isophorone diamine, tetrahydro-diamine dicyclopentadiene, tricyclo(6.2.1.02,7)-dimethyl-undecene, 4,4'-methylenebis(cyclohexylamine), 1,2-diaminoethane, 4,4'-diaminodiphenylmethane, 4,4'-diaminodiphenylether, 5-[4-(4-n-pentylcyclohexyl)cyclohexyl]phenylmethylene-1,3-diaminobenzene, 1,1-bis[4-4-aminophenoxy) phenyl]-4-(4-ethylphenyl)cyclohexane, 2,4-diaminophenyl ethyl formate, the diamine compounds of formulas (VI-1-1), (VI-1-2), (VI-2-1), and (VI-2-11), p-diaminobenzene, m-diaminobenzene, o-diaminobenzene, the diamine compound represented by formula (VI-8-1), and combinations thereof.

The first diamine compound of formula (I) is in an amount ranging preferably from 5 to 25 moles, more preferably from 8 to 22 moles, and most preferably from 10 to 20 moles based on 100 moles of the diamine component.

The second diamine compound of formula (II) is in an amount ranging preferably from 5 to 25 moles, more preferably from 8 to 22 moles, and most preferably from 10 to 20 moles based on 100 moles of the diamine component.

The another diamine compound is in an amount ranging preferably from 50 moles to 90 moles, more preferably from 56 moles to 84 moles, and most preferably from 60 moles to 80 moles based on 100 moles of the diamine component.

The polymer composition of the liquid crystal alignment agent includes a polyamic acid compound, a polyimide compound, a polyimide series block copolymer, combinations thereof.

Polyamic Acid Compound:

A polyamic acid compound is obtained by subjecting the tetracarboxylic dianhydride component and the diamine component to a polycondensation reaction. The polycondensation reaction is conducted in a solvent at a temperature ranging from 0° C. to 100° C. for a period ranging from 1 hour to 24 hours to obtain a reaction solution. The reaction solution is distilled under a reduced pressure in a distiller to obtain the polyamic acid compound. Alternatively, the reaction solution can be treated by pouring it into a large amount of poor solvent to obtain a precipitate, which is then dried under a reduced pressure to obtain the polyamic acid compound.

The tetracarboxylic dianhydride component is used in an amount ranging preferably from 20 moles to 200 moles, and more preferably from 30 moles to 120 moles based on 100 moles of the diamine component.

The solvent for the polycondensation reaction may be the same or different from the solvent used in the liquid crystal alignment agent. Furthermore, there is no particular limitation to the solvent for the polycondensation reaction as long as the solvent is able to dissolve the reactants and the products. Examples of the solvent for the polycondensation reaction include, but are not limited to, (1) aprotic polar solvents, such as 1-methyl-2-pyrrolidone, N,N-dimethylacetamide, N,N-dimethylformamide, dimethylsulfoxide, γ-butyrolactone, tetramethylurea, hexamethylphosphoric acid triamide, or the like; and (2) phenolic solvents, such as m-cresol, xylenol, phenol, halogenated phenols, or the like.

The solvent for the polycondensation reaction is used in an amount ranging preferably from 200 to 2,000 parts by weight, and more preferably from 300 to 1,800 parts by weight based on 100 parts by weight of the mixture of the tetracarboxylic dianhydride component and the diamine component.

Particularly, the aforementioned solvent for the polycondensation reaction can be used in combination with the poor solvent in an appropriate amount that does not cause precipitation of the formed polyamic acid compound. Examples of the poor solvent include, but are not limited to, (1) alcohols, such as methyl alcohol, ethyl alcohol, isopropyl alcohol, cyclohexanol, ethylene glycol, propylene glycol, 1,4-butanediol, triethylene glycol, or the like; (2) ketones, such as acetone, methyl ethyl ketone, methyl isobutyl ketone, cyclohexanone, or the like; (3) esters, such as methyl acetate, ethyl acetate, butyl acetate, diethyl oxalate, diethyl malonate, ethylene glycol ethyl ether acetate, or the like; (4) ethers, such as diethyl ether, ethylene glycol methyl ether, ethylene glycol ethyl ether, ethylene glycol n-propyl ether, ethylene glycol i-propyl ether, ethylene glycol n-butyl ether, ethylene glycol dimethyl ether, diethylene glycol dimethyl ether, or the like; (5) halogenated hydrocarbons, such as dichloromethane, 1,2-dichloroethane, 1,4-dichlorobutane, trichloroethane, chlorobenzene, o-dichlorobenzene, or the like; (6) hydrocarbons, such as tetrahydrofuran, hexane, heptane, octane, benzene, toluene, xylene, or the like; and combinations thereof. The examples of the poor solvent may be used alone or in admixture of two or more.

The poor solvent is used in an amount ranging preferably from 0 to 60 parts by weight, and more preferably from 0 to 50 parts by weight based on 100 parts by weight of the diamine component.

Polyimide Compound:

The polyimide compound is obtained by subjecting the tetracarboxylic dianhydride component and the diamine component to a polymerization reaction in a solvent to obtain a polyamic acid compound followed by a dehydration/ring-closure reaction, which is conducted by heating in the presence of a dehydrating agent and a catalyst. The auric acid functional group of the polyamic acid compound is converted (i.e., imidized) to the imido functional group via the dehydration/ring-closure reaction so as to obtain the polyimide compound.

The tetracarboxylic dianhydride component and the diamine component for preparation of the polyimide compound are the same as the tetracarboxylic dianhydride component and the diamine component for obtaining the polyamic acid compound.

The solvent for the dehydration/ring-closure reaction may be the same as the solvent used in the liquid crystal alignment agent. The solvent for the dehydration/ring-closure reaction is used in an amount ranging preferably from 200 to 2,000 parts by weight, and more preferably from 300 to 1,800 parts by weight based on 100 parts by weight of the polyamic acid compound.

Heating temperature for the dehydration/ring-closure reaction ranges preferably from 40° C. to 200° C. and more preferably from 40° C. to 150° C. If the heating temperature of the dehydration/ring-closure reaction is lower than 40° C., the dehydration/ring-closure reaction may not be fully implemented and the imidization ratio would be unsatisfactory. If the reaction temperature exceeds 200° C., the weight average molecular weight of the obtained polyimide compound would be reduced.

The polymer composition used in the liquid crystal alignment agent of the disclosure has an imidization ratio ranging preferably from 30% to 90%, more preferably from 40 to 85%, and most preferably from 50 to 80%. When the polymer composition having the imidization ratio of the defined range is used, the ion density of the liquid crystal display element having the liquid crystal alignment film made thereby may be further reduced.

Examples of the dehydrating agent for the dehydration/ring-closure reaction that is suitable for the disclosure include, but are not limited to, acid anhydride compounds, such as acetic anhydride, propionic anhydride, trifluoroacetic anhydride, or the like. The dehydrating agent is used in amount ranging from 0.01 mole to 20 moles per mole of the polyamic compound. Examples of the catalyst for the dehydration/ring-closure reaction that is suitable for the disclosure include pyridine compounds, such as pyridine, trimethyl pyridine, dimethyl pyridine, or the like; and tertiary amines, such as triethylamine, or the like. The catalyst is used in an amount ranging from 0.5 mole to 10 moles per mole of the dehydrating agent.

Polyimide Series Block Copolymer:

Examples of the polyimide series block copolymer include, but are not limited to, polyamic acid block copolymer, polyimide block copolymer, polyamic acid-polyimide block copolymer, and combinations thereof.

The polyimide series block copolymer is obtained by the polycondensation reaction of a starting material which includes at least one of the aforesaid polyamic acid compounds and/or at least one of the aforesaid polyimide compounds and which can further include a tetracarboxylic dianhydride component and a diamine component in a solvent.

The tetracarboxylic dianhydride component and the diamine component included in the starting material are the same as the tetracarboxylic dianhydride component and the diamine component used for the preparation of the polyamic acid compound, and the solvent used for obtaining the polyimide series block copolymer is the same as the solvent used for the preparation of the liquid crystal alignment agent.

The solvent for the polycondensation reaction is used in an amount ranging preferably from 200 to 2,000 parts by weight, and more preferably from 300 to 1,800 parts by weight based on 100 parts by weight of the starting material.

The operation temperature for the polycondensation reaction ranges preferably from 0° C. to 200° C., and more preferably from 0° C. to 100° C.

Preferably, examples of the starting material used for obtaining the polyimide series block copolymer include, but are not limited to: (1) first and second polyamic acid compounds which are different from each other in terminal groups and structures thereof; (2) first and second polyimide compounds which are different from each other in terminal groups and structures thereof; (3) a polyamic acid compound and a polyimide compound which are different from each other in terminal groups and structures thereof; (4) a polyamic acid compound, a tetracarboxylic dianhydride component, and a diamine component, wherein at least one of the tetracarboxylic dianhydride component and the diamine component is structurally different from the one used for obtaining the polyamic acid compound; (5) a polyimide compound, a tetracarboxylic dianhydride component, and a diamine component, wherein at least one of the tetracarboxylic dianhydride component and the diamine component is structurally different from the one used for obtaining the polyimide compound; (6) a polyamic acid compound, a polyimide compound, a tetracarboxylic dianhydride component, and a diamine component, wherein at least one of the tetracarboxylic dianhydride component and the diamine component is structurally different from the ones used for obtaining the polyamic acid compound and the polyimide compound; (7) first and second polyamic acid compounds, a tetracarboxylic dianhydride component, and a diamine component, wherein the first and second polyamic acid compounds are structurally different from each other; (8) first and second polyimide compounds, a tetracarboxylic dianhydride component, and a diamine component, wherein the first and second polyimide compounds are structurally different from each other; (9) first and second polyamic acid compounds and a diamine component, wherein the first and second polyamic acid compounds have anhydride terminal groups and are structurally different from each other; (10) first and second polyamic acid compounds and a tetracarboxylic dianhydride component, wherein the first and second polyamic acid compounds have amino terminal groups and are structurally different from each other; (11) first and second polyimide compounds and a diamine component, wherein the first and second polyimide compounds have anhydride terminal groups and are structurally different from each other; and (12) first and second polyimide compounds and a tetracarboxylic dianhydride component, wherein the first and second polyimide compounds have amino terminal groups and are structurally different from each other.

Preferably, the polyamic acid compound, the polyimide compound, and the polyimide series block copolymer can be the polymers which are terminal-modified after an adjustment of molecular weight thereof as long as the desirable effects of the disclosure are not reduced. The terminal-modified polymers can be used to improve the coating performance of the liquid crystal alignment agent. The process for synthesizing the terminal-modified polymers involves adding a monofunctional compound to the reaction system during the polycondensation reaction for the polyamic acid compound.

Examples of the monofunctional compound include, but are not limited to, (1) monoanhydride compounds, such as maleic anhydride, phthalic anhydride, itaconic anhydride, n-decyl succinic anhydride, n-dodecyl succinic anhydride, n-tetradecyl succinic anhydride, n-hexadecyl succinic anhydride, and the like; (2) monoamine compounds, such as aniline, cyclohexylamine, n-butylamine, n-amylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine, n-eicosylamine, and the like; and (3) monoisocyanate compounds, such as phenyl isocyanate, naphthylisocyanate, and the like.

The polymer composition of the disclosure has a weight average molecular weight in terms of polystyrene measured by gel permeation chromatography (GPC) of from 2,000 to 200,000, preferably from 3,000 to 100,000, and more preferably from 4,000 to 50,000.

Polysiloxane:

The polysiloxane contains an epoxy-based group. The epoxy-based group is includes functional groups of formula (B-1), formula (B-2), formula (B-3), and the combinations thereof,

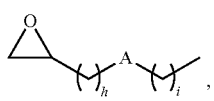

(B-1)

where

A is selected from the group consisting of oxygen and a single bond, h is an integer ranging from 1 to 3, and i is an integer ranging from 0 to 6 with the proviso that A is a single bond when i is 0,

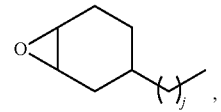

(B-2)

where j is an integer ranging from 0 to 6;

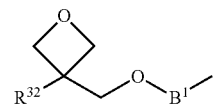

(B-3)

where $B^1$ represents a $C_2$-$C_6$ alkylene group, and
$R^{32}$ represents a hydrogen atom or a $C_1$-$C_6$ alkyl group.

When the polysiloxane containing an epoxy-based group is not included in the liquid crystal alignment agent, the liquid crystal display element including the liquid crystal alignment film formed from the liquid crystal alignment agent has high ion density.

The polysiloxane is used in an amount ranging preferably from 3 to 30 parts by weight, more preferably from 4 to 25 parts by weight, and most preferably from 5 to 20 parts by weight based on 100 parts by weight of the polymer composition.

Preferably, the polysiloxane is obtained by subjecting a silane component to polycondensation. The silane component includes a first silane compound and a second silane compound.

First Silane Compound:

The first silane compound is represented by formula (III):

$Si(R^{25})_y(OR^{26})_{4-y}$ (III)

where at least one $R^{25}$ is a functional group selected from the group consisting of the formula (B-1), the formula (B-2), the formula (B-3), and the combinations thereof, and the rest of $R^{25}$ is independently selected from the group consisting of a hydrogen atom, a $C_1$-$C_{10}$ alkyl group, a $C_2$-$C_{10}$ alkenyl group, and a $C_6$-$C_{15}$ aryl group, each $R^{26}$ is independently selected from the group consisting of a hydrogen atom, a $C_1$-$C_6$ alkyl group, a $C_1$-$C_6$ acyl group, and a $C_6$-$C_{15}$ aryl group, and Y is an integer ranging from 1 to 3.

Examples of the first silane compound of formula (III) include, but are not limited to, 3-(N,N-diglycidyl)aminopropyl trimethoxysilane, 3-(N-allyl-N-glycidyl)aminopropyl trimethoxysilane, 3-glycidyloxypropyl trimethoxysilane, 3-glycidyloxypropyl triethoxysilane, 3-glycidyloxypropylmethyl dimethoxysilane, 3-glycidyloxypropylmethyl diethoxysilane, 3-glycidyloxypropyldimethyl methoxysilane, 3-glycidyloxypropyldimethyl ethoxysilane, 2-glycidyloxyethyltrimethoxysilane, 2-glycidyloxyethyl triethoxysilane, 2-glycidyloxyethylmethyl dimethoxysilane, 2-glycidyloxyethylmethyl diethoxysilane, 2-glycidyloxyethyldimethyl methoxysilane, 2-glycidyloxyethyldimethyl ethoxysilane, 4-glycidyloxybutyl trimethoxysilane, 4-glycidyloxybutyl triethoxysilane, 4-glycidyloxybutylmethyl dimethoxysilane, 4-glycidyloxybutylmethyl diethoxysilane, 4-glycidyloxybutyldimethyl methoxysilane, 4-glycidyloxybutyldimethyl ethoxysilane, 2-(3,4-epoxycyclohexyl)ethyl trimethoxysilane, 2-(3,4-epoxycyclohexyl)ethyl triethoxysilane, 3-(3,4-epoxycyclohexyl)propyl trimethoxysilane, 3-(3, 4-epoxycyclohexyl)propyl triethoxysilane, [(3-ethyl-3-oxetanyl)methoxy]propyl trimethoxysilane, [(3-ethyl-3-oxetanyl)methoxy]propyl triethoxysilane, [(3-ethyl-3-oxetanyl)methoxy]propylmethyldimethoxysilane, and [(3-ethyl-3-oxetanyl)methoxy]propyldimethyldimethoxysilane. The examples of the first silane compound of formula (III) may be used alone or in admixture of two or more thereof.

Among the aforesaid examples of the first silane compound of formula (III), preferred are 3-glycidyloxypropyl trimethoxysilane, 2-glycidyloxyethyltrimethoxysilane, 4-glycidyloxybutyl trimethoxysilane, 2-(3,4-epoxycyclohexyl)ethyltrimethoxysilane, 2-(3,4-epoxycyclohexyl)ethyltriethoxysilane, [(3-ethyl-3-oxetanyl)methoxy]propyltrimethoxysilane, [(3-ethyl-3-oxetanyl)methoxy]propyltriethoxysilane, and combinations thereof.

The first silane compound of formula (III) is in an amount ranging from 0.3 to 1.0 mole, preferably from 0.35 to 0.95 mole, and more preferably from 0.4 to 0.9 mole based on 1 mole of the silane component. A low ion density of a liquid crystal display element employing a liquid crystal alignment film formed from the liquid crystal alignment agent can be maintained even after long-term UV irradiation when the amount of the first silane compound of formula (III) is in the above mentioned range. Second Silane Compound:

The second silane compound is represented by formula (V):

$$Si(R^{29})_b(OR^{30})_{4-b} \quad (IV)$$

where each $R^{29}$ is independently selected from the group consisting of a hydrogen atom, a $C_1$-$C_{10}$ alkyl group, a $C_2$-$C_{10}$ alkenyl group, and a $C_6$-$C_{15}$ aryl group, each $R^{30}$ is independently selected from the group consisting of a hydrogen atom, a $C_1$-$C_6$ alkyl group, a $C_1$-$C_6$ acyl group, and a $C_6$-$C_{15}$ aryl group, and b is an integer ranging from 0 to 3.

When b denotes 0, the second silane compound represents a tetrafunctional silane. When b denotes 1, the second silane compound represents a trifunctional silane. When b denotes 2, the second silane compound represents a difunctional silane. When b denotes 3, the second silane compound represents a monofunctional silane.

Examples of the second silane compound of formula (IV) include, but are not limited to, (1) Tetrafunctional silane, such as tetrachlorosilane, tetramethoxysilane, tetraethoxysilane, tetra-n-propoxysilane, tetra-i-propoxysilane, tetra-n-butoxysilane, tetra-sec-butoxysilane, or the like; (2) Trifunctional silane, such as trichlorosilane, trimethoxysilane, triethoxysilane, fluorotrichlorosilane, fluorotrimethoxysilane, fluorotriethoxysilane, methyl trichlorosilane, methyl trimethoxysilane, methyl triethoxysilane, 2-(trifluoromethyl)ethyl trichlorosilane, 2-(trifluoromethyl)ethyl trimethoxysilane, 2-(trifluoromethyl)ethyl triethoxysilane, hydroxymethyl trichlorosilane, hydroxymethyl trimethoxysilane, hydroxyethyl trimethoxysilane, mercaptomethyltrichlorosilane, 3-mercaptopropyltrichlorosilane, mercaptomethyltrimethoxysilane, mercaptomethyltriethoxysilane, 3-mercaptopropyltrimethoxysilane, 3-mercaptopropyltriethoxysilane, phenyltrichlorosilanephenyltrimethoxysilane, phenyl triethoxysilane, orthelike; (3) Difunctionalsilane, such as methyl dichlorosilane, methyldimethoxysilane, methyl diethoxysilane, dimethyl dimethoxysilane, dimethyl diethoxysilane, methyl[2-(perfluoro-n-octyl)ethyl]dichlorosilane, methyl[2-(perfluoro-n-octyl)ethyl]dimethoxysilane, 3-mercaptopropylmethyldichlorosilane, 3-mercaptopropylmethyldimethoxysilane, diphenyl dichlorosilane, diphenyl dimethoxysilane, or the like; (4) Monofunctional silane, such as chlorodimethylsilane, methoxydimethylsilane, chlorotrimethylsilane, bromotrimethylsilane, iodotrimethylsilane, methoxytrimethylsilane, chloromethyl diphenylsilane, methoxymethyldiphenylsilane, or the like.

Commercially available examples of the second silane compound represented by formula (IV) are products such as KC-89, KC-89S, X-21-3153, X-21-5841, X-21-5842, X-21-5843, X-21-5844, X-21-5845, X-21-5846, X-21-5847, X-21-5848, X-22-160AS, X-22-170B, X-22-170BX, X-22-170D, X-22-170DX, X-22-176B, X-22-176D, X-22-176DX, X-22-176F, X-40-2308, X-40-2651, X-40-2655A, X-40-2671, X-40-2672, X-40-9220, X-40-9225, X-40-9227, X-40-9246, X-40-9247, X-40-9250, X-40-9323, X-41-1053, X-41-1056, X-41-1805, X-41-1810, KF6001, KF6002, KF6003, KR212, KR-213, KR-217, KR220L, KR242A, KR271, KR282, KR300, KR311, KR401N, KR500, KR510, KR5206, KR5230, KR5235, KR9218 and KR9706 manufactured by Shin-Etsu Chemical Co., Ltd.; Glass Resin manufactured by Showa Denko; SH804, SH805, SH806A, SH840, SR2400, SR2402, SR2405, SR2406, SR2410, SR2411, SR2416 and SR2420 manufactured by Dow Corning Toray Co., Ltd.; FZ3711 and FZ3722 manufactured by Nippon Unicar Company Ltd.; DMS-S12, DMS-S15, DMS-S21, DMS-S27, DMS-S31, DMS-S32, DMS-S33, DMS-S35, DMS-S38, DMS-S42, DMS-S45, DMS-S51, DMS-227, PSD-0332, PDS-1615, PDS-9931 and XMS-5025 manufactured by JNC Corporation; Methyl Silicate MS51 and Methyl Silicate MS56 manufactured by Mitsubishi Chemical Corporation; Ethyl Silicate 28, Ethyl Silicate 40 and Ethyl Silicate 48 manufactured by Colcoat Co., Ltd.; and GR100, GR650, GR908 and GR950 manufactured by Showa Denko.

Among the aforesaid examples of the second silane compound of formula (IV), preferred are tetramethoxysilane, tetraethoxysilane, methyl trimethoxysilane, methyl triethoxysilane, phenyl trimethoxysilane, phenyl triethoxysilane, 3-mercaptopropyltrimethoxysilane, 3-mercaptopropyltriethoxysilane, mercaptomethyltrimethoxysilane, mercaptomethyltriethoxysilane, dimethyldimethoxysilane, dimethyl diethoxysilane, and combinations thereof.

The second silane compound of formula (IV) is in an amount ranging from 0 to 0.7 mole, preferably from 0.05 to 0.65 mole, and more preferably from 0.1 to 0.6 mole based on 1 mole of the silane component.

Method of Preparing the Polysiloxane:

The condensation for preparing the polysiloxane can be conducted in a manner well known in the art. For example, an organic solvent, water, and optionally a catalyst are added to the silane component, followed by heating in, for example, an oil bath at a temperature ranging from 50° C. to 150° C. for 0.5 hour to 120 hours. During heating, the mixture may be stirred or under a reflux condition, if necessary.

There is no specific limitation to the organic solvent, which can be identical with or different from the solvent included in the liquid crystal alignment agent.

The organic solvent is selected from hydrocarbon, ketone, ester, ether and alcohol.

Examples of the hydrocarbon include toluene and xylene; examples of the ketone include methyl ethyl ketone, methyl isobutyl ketone, methyl n-amyl ketone, diethyl ketone and cyclohexanone; examples of the ester include ethyl acetate, n-butyl acetate, i-amyl acetate, propylene glycol monomethyl ether acetate, 3-methoxybutyl acetate and ethyl lactate; examples of the ether include ethylene glycol dimethyl ether, ethylene glycol diethyl ether, tetrahydrofuran and dioxane; and examples of the alcohol include 1-hexanol, 4-methyl-2-pentanol, ethylene glycol monomethyl ether, ethylene glycol monoethyl ether, ethylene glycol mono-n-propyl ether, ethylene glycol mono-n-butyl ether, propylene glycol monomethyl ether, propylene glycol monoethyl ether and propylene glycol mono-n-propyl ether. These organic solvents may be used alone or in combination of two or more.

The amount of the organic solvent is preferably from 10 to 10,000 parts by weight, and more preferably from 50 to 1,000 parts by weight based on 100 parts by weight of the total of the silane compounds.

The amount of water is preferably ranging from 0.5 mole to 100 moles, more preferably ranging from 1 mole to 30 moles based on 1 mole of the hydrolyzable groups of the total of the silane compounds.

Catalyst may be but is not limited to, an acid, an alkali metal compound, an organic base, titanium compound, or zirconium compound.

Examples of the acid include, but are not limited to, hydrochloric acid, nitric acid, sulfuric acid, hydrofluoric acid, oxalic acid, phosphoric acid, acetic acid, trifluoroacetic acid, formic acid, polycarboxylic acids and combinations thereof.

Examples of the alkali metal compound include sodium hydroxide, potassium hydroxide, sodium methoxide, potassium methoxide, sodium ethoxide and potassium ethoxide.

Examples of the organic base include primary and secondary organic amines such as ethylamine, diethylamine, piperazine, piperidine, pyrrolidine and pyrrole; tertiary organic amines such as triethylamine, tri-n-propylamine, tri-n-butylamine, pyridine, 4-dimethylaminopyridine and diazabicycloundecene; and quaternary organic amines such as tetramethylammonium hydroxide.

The amount of the catalyst differs according to the type and reaction conditions such as temperature and should be suitably set. For example, it is preferably 0.01 mole to 5 moles, more preferably 0.03 to 3 moles, and most preferably 0.05 mole to 1 mole based on 1 mole of the total of the silane compounds.

Preferably, after the reaction, an organic solvent layer separated from the reaction solution is washed with water. More preferably, the reaction solution is washed with water containing a small amount of a salt to make the washing operation easier. For example, an aqueous solution containing about 0.2 wt % of ammonium nitrate may be used. The washing operation is carried out until the water layer becomes neutral, and the organic solvent layer is optionally dried with a suitable drying agent such as anhydrous calcium sulfate or molecular sieves to remove the solvent, thereby making it possible to obtain the polysiloxane.

The polysiloxane of the disclosure has a weight average molecular weight in terms of polystyrene measured by gel permeation chromatography (GPC) of from 500 to 100,000, preferably from 800 to 50,000, and more preferably from 1,000 to 20,000.

Solvent:

There is no particular limitation for the solvent useful in the liquid crystal alignment agent of the disclosure as long as it is able to disperse or dissolve the polymer composition and the polysiloxane. Examples of the solvent include, but are not limited to, N-methyl-2-pyrrolidone, γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylethanamide, and the like. The examples of the solvent may be used alone or in admixture of two or more.

The solvent used in the liquid crystal alignment agent is in an amount ranging preferably from 1,000 to 2,000 parts by weight, and more preferably from 1,200 to 2,000 parts by weight based on 100 parts by weight of the polymer composition.

Additives:

The additives such as a compound having at least two epoxy groups in a molecule or a silane compound containing functional groups may be added as long as the intended properties of the liquid crystal alignment agent are not impaired. The additives may be used alone or in admixture of two or more.

Examples of the silane compounds containing functional groups include, but are not limited to, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonylacetate, 9-triethoxysilyl-3,6-diazanonylacetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3-aminopropyltrimethoxysilane, N-bis(oxyethylene)-3-aminopropyltriethoxysilane, and the like.

The silane compound containing functional groups is in an amount ranging from 0 to 10 parts by weight, preferably from 0.5 part by weight to 10 parts by weight based on 100 parts by weight of the polymer composition.

Examples of the compound having at least two epoxy groups in a molecule include, but are not limited to, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromo-neopentyl glycol diglycidyl ether, 1,3,5,6-tetragylcidyl-2,4-hexanediol, N,N,N',N'-tetragylcidyl-m-xylenediamine, 1,3-bis(N,N-digylcidylaminomethyl)cyclohexane, N,N,N',N'-tetragylcidyl-4,4'-diaminodiphenylmethane, N,N-gylcidyl-p-glycidoxyaniline, 3-(N,N-diglycidyl)aminopropyltrimethoxysilane, and the like.

The compound having at least two epoxy groups in a molecule is in an amount ranging from 0 to 40 parts by weight, preferably from 0.1 part by weight to 30 parts by weight based on 100 parts by weight of the polymer composition. When the compound having at least two epoxy groups in a molecule is employed, the ion density of a liquid crystal display element employing a liquid crystal alignment film formed from the liquid crystal alignment agent may be further reduced.

The additive is used in an amount ranging preferably from 0.5 to 50 parts by weight, and more preferably from 1 to 45 parts by weight based on 100 parts by weight of the polymer composition.

There is no particular limitation to the method for manufacturing the liquid crystal alignment agent of the disclosure. The general mixing method can be used. For example, the liquid crystal alignment agent of the disclosure can be produced by mixing the polyamic acid compound, the polyimide compound, and the optional polyimide series block copolymer to obtain the polymer composition, which is then added with the polysiloxane, the solvent and optional additives at a temperature ranging from 0° C. to 200° C., and preferably from 20° C. to 60° C. followed by stirring until the polymer is dissolved in the solvent.

Liquid Crystal Alignment Film:

A liquid crystal alignment film of the disclosure is made from the aforesaid liquid crystal alignment agent.

The prepared liquid crystal alignment agent is applied to a substrate by a roller coating method, a spinner coating method, a printing method, an ink-jet method, or the like to form a coating film. The coating film is then treated by a pre-bake treatment, a post-bake treatment and an alignment treatment to obtain a liquid crystal alignment film.

The pre-bake treatment causes the solvent in the coating film to volatilize. The temperature for the pre-bake treatment ranges preferably from 30° C. to 120° C., more preferably from 40° C. to 110° C., and most preferably from 50° C. to 100° C.

The post-bake treatment is carried out to conduct a dehydration/ring-closure (imidization) reaction. The temperature for the post-bake treatment ranges preferably from 150° C. to 300° C., more preferably from 180° C. to 280° C., and most preferably from 200° C. and 250° C.

There is no particular limitation for the alignment treatment. The alignment treatment can be carried out by rubbing the coating film in a certain direction with a roller wound with a cloth which is made from fibers such as nylon, rayon, cotton, or the like.

Liquid Crystal Display Element:

Referring to FIG. 1, an embodiment of a liquid crystal display element according to the disclosure includes a first unit 11, a second unit 12 spaced apart from the first unit 11, and a liquid crystal unit 13 disposed between the first unit 11 and the second unit 12.

The first unit 11 includes a first substrate 111, a first conductive film 112 formed on the first substrate 111, and a first liquid crystal alignment film 113 formed on the first conductive film 112 and opposite to the first substrate 111.

The second unit 12 includes a second substrate 121, a second conductive film 122 formed on the second substrate 121, and a second liquid crystal alignment film 123 formed on the second conductive film 122 and opposite to the second substrate 121.

The first and second substrates 111, 121 suitable for the disclosure are made of a transparent material, for example, alkali-free glass, soda-lime glass, hard glass (Pyrex glass), quartz glass, polyethylene terephthalate, polybutylene terephthalate, polyether sulphone, polycarbonate, or the like commonly used in liquid crystal display devices. The first and second conductive films 112, 122 are made of tin oxide ($SnO_2$), indium oxide-tin oxide ($In_2O_3$—$SnO_2$), or the like.

The first and second liquid crystal alignment films 113, 123 are respectively made from the liquid crystal alignment agent of the disclosure, and are used for providing the liquid crystal unit 13 with a pretilt angle. The liquid crystal unit 13 can be activated by an electric field cooperatively produced by the first and second conductive films 112, 122.

Examples of the liquid crystals suitable for the liquid crystal unit 13 include, but are not limited to, diaminobenzene liquid crystals, pyridazine liquid crystals, Shiff Base liquid crystals, azoxy liquid crystals, biphenyl liquid crystals, phenylcyclohexane liquid crystals, ester liquid crystals, terphenyl liquid crystals, biphenylcyclohexane liquid crystals, pyrimidine liquid crystals, dioxane liquid crystals, bicyclooctane liquid crystals, and cubane liquid crystals. Furthermore, cholesterol liquid crystals, such as cholesteryl chloride, cholesteryl nonanoate, and cholesteryl carbonate, or chiral agents which are sold under the trade names C-15, CB-15 (manufactured by Merck Company), or the like, or ferroelectric liquid crystals, such as p-(decyloxybenzylidene)-p-amino-(2-methyl-butyl) cinnamate, may be added to the above liquid crystals, as required. The aforesaid examples of the liquid crystals can be used alone or in admixture of two or more.

EXAMPLES

The following examples are provided to illustrate the embodiments of the disclosure, and should not be construed as limiting the scope of the disclosure.

[Preparation of the Polymer Composition]

Preparation of Polyamic Acid Compound

Synthesis Example 1

A 500 ml four-necked conical flask equipped with a nitrogen inlet, a stirrer, a condenser and a thermometer was purged with nitrogen, and was added with a first diamine compound of the aforesaid formula (I-5) (4.44 g, 0.0075 mole) (b-1-1), a second diamine compound of the aforesaid formula (II-5) (1.16 g, 0.0025 mole) (b-2-1), p-diaminobenzene (4.32 g, 0.04 mole) (b-3-1), and N-methyl-2-pyrrolidone (80 g). Stirring was conducted at room temperature until the aforesaid diamine compounds were dissolved. 2,3,5-cyclopentanetricarboxylic acid (11.2 g, 0.05 mole) (a-1) and N-methyl-2-pyrrolidone (20 g) were then added, and reaction was conducted for 2 hours at room temperature. The reaction solution was then poured into water (1500 ml) to precipitate a polymer. The polymer obtained after filtering was then washed with methanol and filtered three times, and was then dried in a vacuum oven at 60° C. to obtain a polymer composition (A-1-1).

Synthesis Examples 2 to 5 and Comparative Synthesis Examples 1 to 3 and 6

Polymer compositions (A-1-2) to (A-1-5), (A-3-1) to (A-3-3) and (A-3-6) were prepared according to the method of Synthesis Example 1, except that the types of the tetracarboxylic dianhydride compounds and the diamine compounds and the amounts thereof shown in Table 1 and 2 were used.

Preparation of Polyimide Compound

Synthesis Example 6

A 500 ml four-necked conical flask equipped with a nitrogen inlet, a stirrer, a condenser and a thermometer was purged with nitrogen, and was added with a first diamine compound of the aforesaid formula (I-5) (4.44 g, 0.0075 mole) (b-1-1), a second diamine compound of the aforesaid formula (II-5) (1.16 g, 0.0025 mole) (b-2-1), p-diaminobenzene (4.32 g, 0.04 mole) (b-3-1), and N-methyl-2-pyrrolidone (80 g). Stirring was conducted at room temperature until the aforesaid diamine compounds were dissolved. 2,3,5-cyclopentanetricarboxylic acid (11.2 g, 0.05 mole) (a-1) and N-methyl-2-pyrrolidone (20 g) were then added, and reaction was conducted for 6 hours at room temperature. N-methyl-2-pyrrolidone (97 g), acetic anhydride (2.55 g), and pyridine (19.75 g) were then added into the reaction solution. Stirring was continued for 2 hours at 60° C. to conduct imidization reaction. The reaction solution was then poured into water (1500 ml) to precipitate a polymer. The polymer obtained after filtering was then washed with methanol and filtered three times, and was dried in a vacuum oven at 60° C. to obtain a polyimide compound (A-2-1).

Synthesis Examples 7 to 13 and Comparative Synthesis Examples 4 to 5

Polyimide compounds (A-2-2) to (A-2-8) and (A-3-4), (A-3-5) were prepared according to the method of Synthesis Example 6, except that the types of the tetracarboxylic dianhydride compounds, the diamine compounds, the catalyst and the dehydrating agent and the amounts thereof shown in Table 1 and 2 were used.

Preparation of Polysiloxane

Synthesis Example 14

A 500 ml three-necked flask was added with 2-glycidoxylethyltrimethoxysilane (referred to as GETMS, 111.1 g, 0.50 mole), dimethyldimethoxysilane (referred to as DMDMS, 12 g, 0.10 mole), methyltrimethoxysilane (referred to as MTMS, 54.4 g, 0.40 mole), and propyleneglycolmonoethylether (referred to as PGEE, 6 g). Stirring was conducted at room temperature while a triethylamine (referred to as TEA) aqueous solution (20 g TEA/200 g H$_2$O) was added over 30 minutes. The mixture in the flask was then stirred in an oil bath at a temperature of 30° C. for 30 minutes. The temperature of the oil bath was raised to 90° C. within a succeeding 30 minutes until the temperature of the mixture in the flask reached 75 t. The mixture in the flask was stirred for a further 6 hours to conduct polycondensation. After the polycondensation was complete, an organic layer was taken out of the flask and was washed with an aqueous ammonium nitrate solution (2 wt %) to obtain the polysiloxane (B-1).

The first and second silane compounds, the solvents, and the catalysts, the amounts thereof, and the reaction conditions used in the preparation examples for preparing polysiloxane are summarized in Table 3.

Synthesis Example 15 to 19 and Comparative Synthesis Examples 7 to 8

Polysiloxanes (B-2) to (B-6) and (B'-1) to (B'-2) were prepared according to the method of Synthesis Example 14, except that the silane compound component, the solvents, and the catalysts, the amounts thereof, and the reaction conditions used in the preparation examples are summarized in Table 3.

Preparation of Liquid Crystal Alignment Agent, Liquid Crystal Alignment Film, and Liquid Crystal Display Element Example 1

100 parts by weight of the polymer composition of Synthesis Example 1, 5 parts by weight of the polysiloxane of Synthesis Example 14, 1200 parts by weight of N-methyl-2-pyrrolidone, and 600 parts by weight of ethylene glycol n-butyl ether were stirred at room temperature to form a liquid crystal alignment agent.

The liquid crystal alignment agent was coated onto two glass substrates each having an ITO (indium-tin-oxide) conductive film using a printing machine (manufactured by Japan Nissha Printing Co., Ltd., Model 515-036), after which the glass substrates coated with the alignment agent were pre-baked on a heating plate at a temperature of 100° C. for 5 minutes, and were then post-baked in a hot air circulation baking oven at a temperature of 220° C. for 30 minutes. An alignment process was then carried out on the surface of the film. Two glass substrates each coated with the liquid crystal alignment film were thus manufactured by the aforementioned steps.

Thermo-compression adhesive agent was applied to one glass substrate, and spacers of 4 μm were sprayed on the other glass substrate. The two glass substrates were aligned and bonded together in a vertical direction, and then 10 kg of pressure was applied using a thermocompressor to carry out thermocompression at 150° C. Liquid crystal was poured using a liquid crystal pouring machine (manufactured by Shimadzu Corporation, Model ALIS-100X-CH), and ultra-violet light was used to harden a sealant to seal the liquid crystal injection hole, and then an annealing treatment was conducted in an oven at 60° C. for 30 minutes, by means of which a liquid crystal display element was manufactured.

The liquid crystal alignment agent and the liquid crystal display element obtained thereby were evaluated according to the following evaluation methods. The evaluation results are shown in Table 4.

Examples 2 to 15 and Comparative Examples 1 to 10

Examples 2 to 15 and Comparative Examples 1 to 10 were conducted in a manner identical to Example 1 using the polymer compositions, the polysiloxane, the solvents, and the additives and the amounts thereof shown in Tables 4 and 5 to prepare the liquid crystal alignment agents, the liquid crystal alignment films, and the liquid crystal display elements. The obtained liquid crystal alignment agents, the liquid crystal alignment films, and the liquid crystal display elements were evaluated according to the following evaluation methods. The results are shown in Tables 4 and 5.

[Evaluation Items]

1. Imidization Ratio:

Imidization ratio refers to a ratio of the number of the imide ring to a total of the number of the amic acid functional group and the number of the imide ring in the polyimide polymer, and is represented in percentage.

Each of the polymers obtained from Synthesis Examples 1 to 13 and Comparative Synthesis Examples 1 to 6 was dried under a reduced pressure, and was then dissolved in a proper deuteration solvent, for example, deuterated dimethylsulfoxide. $^1$H-NMR determination was conducted at room temperature (for example, 25° C.) using tetramethylsilane as a standard. The imidization ratio (in %) was calculated using the following formula:

$$\text{Imidization ratio}(\%)=[1-\Delta^1/(\Delta^2\times\alpha)]\times 100$$

wherein $\Delta^1$ is a peak area produced by a chemical shift around 10 ppm of the proton of NH group;

$\Delta^2$ is a peak area of the proton other than that of the NH group; and

α is a ratio of the number of the proton of the NH group to the number of the proton other than that of the NH group in a precursor of polyamic acid polymer.

2. Ion Density:

The ion density of each of the liquid crystal display elements of Examples 1 to 15 and Comparative Examples 1 to 10 was measured using an electrical measuring machine (manufactured by TOYO Corporation, Model 6254) under measurement conditions of a voltage of 1.7 V and a triangular wave of 0.01 Hz. In a current and voltage wave form, a peak area between 0 and 1 V was calculated to obtain the ion density (ID1). Each of the liquid crystal display elements was then irradiated by a UV light of 4200 mJ/cm² using a UV irradiation machine (KN-SH48K1 manufactured by Kuang Neng). The ion density (ID2) after the UV irradiation was measured and recorded in the same manner. UV stability ($ID^{UV}$) based on the ion density was calculated according to the following equation and was evaluated according to the following standards:

$$ID^{UV}(\%) = \frac{ID2 - ID1}{ID1} \times 100\%$$

⊚: $ID^{UV}$<10%
○: 10%≤$ID^{UV}$<15%
Δ: 15≤$ID^{UV}$<20%
X: $ID^{UV}$≥20%

TABLE 1

| Components Unit: mole (%) | | Synthesis Examples | | | | | | | | | | | | |
|---|---|---|---|---|---|---|---|---|---|---|---|---|---|
| | | 1 A-1-1 | 2 A-1-2 | 3 A-1-3 | 4 A-1-4 | 5 A-1-5 | 6 A-2-1 | 7 A-2-2 | 8 A-2-3 | 9 A-2-4 | 10 A-2-5 | 11 A-2-6 | 12 A-2-7 | 13 A-2-8 |
| Tetracarboxylic Dianhydride | a-1 | 100 | — | — | — | 100 | 100 | — | — | — | 100 | — | 80 | — |
| | a-2 | — | 100 | — | 50 | — | — | 100 | — | 50 | — | 100 | — | 100 |
| | a-3 | — | — | 100 | — | — | — | — | 100 | — | — | — | 20 | — |
| | a-4 | — | — | — | 50 | — | — | — | — | 50 | — | — | — | — |
| First Diamine Compound of Formula (I) | b-1-1 | 15 | — | — | — | — | 15 | — | — | — | — | 8 | — | — |
| | b-1-2 | — | 5 | — | — | 20 | — | 5 | — | — | 20 | — | — | 10 |
| | b-1-3 | — | — | 20 | — | 5 | — | — | 20 | — | 5 | — | 12 | — |
| | b-1-4 | — | — | — | 10 | — | — | — | — | 10 | — | — | — | — |
| Second Diamine Compound of Formula (II) | b-2-1 | 5 | — | — | — | 20 | 5 | — | — | — | 20 | — | — | 6 |
| | b-2-2 | — | 10 | — | — | — | — | 10 | — | — | — | — | 8 | 6 |
| | b-2-3 | — | — | 25 | — | — | — | — | 25 | — | — | 10 | — | — |
| | b-2-4 | — | — | — | 15 | — | — | — | — | 15 | — | 10 | — | — |
| Another Diamine Compound | b-3-1 | 80 | — | — | 75 | — | 80 | — | — | 75 | — | — | — | 70 |
| | b-3-2 | — | 70 | — | — | 55 | — | 70 | — | — | 55 | — | 10 | — |
| | b-3-3 | — | 15 | — | — | — | — | 15 | — | — | — | 60 | — | — |
| | b-3-4 | — | — | 50 | — | — | — | — | 50 | — | — | — | 70 | — |
| | b-3-5 | — | — | 5 | — | — | — | — | 5 | — | — | 12 | — | — |
| | b-3-6 | — | — | — | — | — | — | — | — | — | — | — | — | 8 |
| Imidization Ratio (%) | | 0 | 0 | 0 | 0 | 0 | 0 | 15 | 20 | 26 | 30 | 42 | 55 | 90 |

Notes:
"—": not added
a-1: 2,3,5-cyclopentanetricarboxylic acid
a-2: 1,2,3,4-cyclobutanetetracarboxylic dianhydride
a-3: pyromellitic dianhydride
a-4: a compound having the aforesaid formula (A-1)
b-1-1: a compound represented by formula (I-5)
b-1-2: a compound represented by formula (I-10)
b-1-3: a compound represented by formula (I-26)
b-1-4: a compound represented by formula (I-18)
b-2-1: a compound represented by formula (II-5)
b-2-2: a compound represented by formula (II-8)
b-2-3: a compound represented by formula (II-12)
b-2-4: a compound represented by formula (II-7)
b-3-1: p-diaminobenzene
b-3-2: 4,4'-diaminodiphenyl methane
b-3-3: 4,4'-diaminodiphenyl ether
b-3-4: 1-octadecyl-2,4-diamine benzene
b-3-5: a compound represented by formula (VI-1-2)
b-3-6: a compound represented by formula (VI-2-10)

TABLE 2

| Components Unit: mole (%) | | Comparative Synthesis Examples | | | | | |
|---|---|---|---|---|---|---|---|
| | | 1 A-3-1 | 2 A-3-2 | 3 A-3-3 | 4 A-3-4 | 5 A-3-5 | 6 A-3-6 |
| Tetracarboxylic Dianhydride | a-1 | 100 | — | — | — | — | — |
| | a-2 | — | 100 | — | 50 | 100 | — |
| | a-3 | — | — | 100 | 50 | — | — |
| | a-4 | — | — | — | — | — | 100 |
| First Diamine Compound of Formula (I) | b-1-1 | — | — | — | — | 8 | — |
| | b-1-2 | — | 5 | — | — | — | — |
| | b-1-3 | — | — | — | — | — | — |
| | b-1-4 | — | — | — | — | — | — |
| Second Diamine Compound of Formula (II) | b-2-1 | 5 | — | — | — | — | — |
| | b-2-2 | — | — | — | — | — | — |
| | b-2-3 | — | — | — | — | — | — |
| | b-2-4 | — | — | — | 15 | — | — |
| Another Diamine Compound | b-3-1 | 85 | — | 45 | 75 | — | — |
| | b-3-2 | 10 | 70 | — | — | — | — |
| | b-3-3 | — | 25 | 50 | — | 60 | — |
| | b-3-4 | — | — | 5 | — | — | — |
| | b-3-5 | — | — | — | 10 | 12 | 100 |
| | b-3-6 | — | — | — | — | 20 | — |
| Imidization Ratio (%) | | 0 | 0 | 0 | 0 | 30 | 55 |

TABLE 3

| Synth. Ex./ Comp. Synth. Ex. | No. | Composition | | | | | | | |
|---|---|---|---|---|---|---|---|---|---|
| | | First Silane compound (moles) | | | | | | Second silane compound (moles) | |
| | | GETMS | GBTMS | ECETS | ECEES | OXTMS | OXTES | MTMS | DMDMS |
| 14 | B-1 | 0.50 | — | — | — | — | — | 0.40 | 0.10 |
| 15 | B-2 | — | — | — | 0.10 | 0.10 | — | 0.60 | — |
| 16 | B-3 | — | 0.25 | 0.40 | — | — | — | — | — |
| 17 | B-4 | 0.15 | — | — | — | — | — | — | 0.55 |
| 18 | B-5 | — | — | — | 1.00 | — | — | — | — |
| 19 | B-6 | — | — | — | — | — | 0.30 | 0.45 | — |
| 7 | B'-1 | — | — | — | — | — | — | 0.40 | 0.10 |
| 8 | B'-2 | — | — | — | — | — | — | 0.65 | — |

| Synth. Ex./ Comp. Synth. Ex. | Composition | | Solvents (g) | | Catalysts (g) | | Reaction Temp. (° C.) | Polycond. Time (hrs) |
|---|---|---|---|---|---|---|---|---|
| | Second silane compound (moles) | | | | | | | |
| | PTMS | PTES | PGEE | DAA | water | TEA | | |
| 14 | — | — | 6 | — | 200 | 20 | 75 | 6 |
| 15 | 0.20 | — | — | 6 | 200 | 20 | 70 | 6.5 |
| 16 | 0.35 | — | — | 8 | 250 | 22 | 80 | 6 |
| 17 | — | 0.30 | 6 | 2 | 250 | 25 | 85 | 5 |
| 18 | — | — | 8 | — | 200 | 20 | 70 | 7 |
| 19 | — | 0.25 | 9 | — | 230 | 20 | 65 | 8 |
| 7 | — | 0.50 | 6 | — | 200 | 20 | 75 | 6 |
| 8 | 0.35 | — | — | 6 | 200 | 20 | 80 | 6 |

Notes:
GETMS 2-glycidoxyethyltrimethoxysilane
GBTMS 4-glycidoxybutyltrimethoxysilane
ECETS 2-(3,4-epoxycyclohexyl)ethyltrimethoxysilane
ECEES 2-(3,4-epoxycyclohexyl)ethyltriethoxysilane
OXTMS [(3-ethyl-3-oxetanyl)methoxy]propyltrimethoxysilane
OXTES [(3-ethyl-3-oxetanyl)methoxy]propyltriethoxysilane
MTMS methyltrimethoxysilane
DMDMS dimethyldimethoxysilane
PTMS phenyltrimethoxysilane
PTES phenyltriethoxysilane
PGME propyleneglycolmonomethylether
MIBK methylisobutylketone
TEA triethylamine
"—" Not added

TABLE 4

| Components Unit: parts by weight | | Examples | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| Polymer compositions | A-1-1 | 100 | — | — | — | — | — | — | — | — | — | — | — | — | — | 50 |
| | A-1-2 | — | 100 | — | — | — | — | — | — | — | — | — | — | — | — | — |
| | A-1-3 | — | — | 100 | — | — | — | — | — | — | — | — | — | — | — | — |
| | A-1-4 | — | — | — | 100 | — | — | — | — | — | — | — | — | — | — | — |

TABLE 4-continued

| Components Unit: parts by weight | | Examples | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | A-1-5 | — | — | — | — | 100 | — | — | — | — | — | — | — | — | — | — |
| | A-2-1 | — | — | — | — | — | 100 | — | — | — | — | — | — | — | — | 50 |
| | A-2-2 | — | — | — | — | — | — | 100 | — | — | — | — | — | — | — | — |
| | A-2-3 | — | — | — | — | — | — | — | 100 | — | — | — | — | — | — | — |
| | A-2-4 | — | — | — | — | — | — | — | — | 100 | — | — | — | — | — | — |
| | A-2-5 | — | — | — | — | — | — | — | — | — | 100 | — | — | — | — | — |
| | A-2-6 | — | — | — | — | — | — | — | — | — | — | 100 | — | — | — | — |
| | A-2-7 | — | — | — | — | — | — | — | — | — | — | — | 100 | — | 50 | — |
| | A-2-8 | — | — | — | — | — | — | — | — | — | — | — | — | 100 | 50 | — |
| | A-3-1 | — | — | — | — | — | — | — | — | — | — | — | — | — | — | — |
| | A-3-2 | — | — | — | — | — | — | — | — | — | — | — | — | — | — | — |
| | A-3-3 | — | — | — | — | — | — | — | — | — | — | — | — | — | — | — |
| | A-3-4 | — | — | — | — | — | — | — | — | — | — | — | — | — | — | — |
| | A-3-5 | — | — | — | — | — | — | — | — | — | — | — | — | — | — | — |
| | A-3-6 | — | — | — | — | — | — | — | — | — | — | — | — | — | — | — |
| polysiloxane | B-1 | 5 | — | — | — | 20 | — | — | — | — | — | — | — | — | — | — |
| | B-2 | — | 10 | — | — | — | — | — | 30 | — | — | 10 | — | — | 5 | — |
| | B-3 | — | — | 15 | — | — | — | — | — | — | 10 | — | — | — | — | — |
| | B-4 | — | — | — | 20 | — | 3 | — | — | 8 | — | — | 6 | — | — | 15 |
| | B-5 | — | — | — | — | 5 | — | — | — | — | 10 | — | — | 25 | — | — |
| | B-6 | — | — | — | — | — | — | 12 | — | — | — | — | — | — | — | 15 |
| | B'-1 | — | — | — | — | — | — | — | — | — | — | — | — | — | — | — |
| | B'-2 | — | — | — | — | — | — | — | — | — | — | — | — | — | — | — |
| Solvents | C-1 | 1200 | — | 1000 | — | — | 1400 | 900 | 850 | 800 | — | 900 | — | 1200 | — | 800 |
| | C-2 | 600 | 1600 | — | 750 | 1500 | — | 300 | 850 | — | 1000 | 900 | 650 | 300 | — | 800 |
| | C-3 | — | — | 600 | 850 | 100 | — | 300 | — | 1000 | 350 | — | 1000 | — | 1500 | — |
| Compound having at least 2 epoxy group | D-1 | — | — | — | 5 | — | — | — | — | — | — | — | — | — | — | — |
| | D-2 | — | — | — | — | — | — | — | — | — | — | — | — | 1 | — | — |
| | D-3 | — | — | — | — | — | — | — | — | 1 | — | — | — | 2 | — | — |
| Results | Ion density | ○ | ○ | ○ | ◎ | ○ | ○ | ○ | ◎ | ◎ | ◎ | ◎ | ◎ | ◎ | ○ | ○ |

Note:
C-1: N-methyl-2-pyrrolidone
C-2: ethylene glycol n-butyl ether
C-3: N,N-dimethylacetamide
D-1: N,N,N',N'-tetraglycidyl-4,4'-diaminodiphenylmethane
D-2: N,N-glycidyl-p-glycidoxyaniline
D-3: propylene glycol diglycidyl ether

TABLE 5

| Components Unit: parts by weight | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| Polymer compositions | A-1-1 | — | — | — | — | — | — | 100 | — | — | — |
| | A-1-2 | — | — | — | — | — | — | — | — | 100 | — |
| | A-1-3 | — | — | — | — | — | — | — | — | — | — |
| | A-1-4 | — | — | — | — | — | — | — | — | — | — |
| | A-1-5 | — | — | — | — | — | — | — | — | — | — |
| | A-2-1 | — | — | — | — | — | — | — | 100 | — | — |
| | A-2-2 | — | — | — | — | — | — | — | — | — | — |
| | A-2-3 | — | — | — | — | — | — | — | — | — | — |
| | A-2-4 | — | — | — | — | — | — | — | — | — | — |
| | A-2-5 | — | — | — | — | — | — | — | — | — | — |
| | A-2-6 | — | — | — | — | — | — | — | — | — | — |
| | A-2-7 | — | — | — | — | — | — | — | — | — | — |
| | A-2-8 | — | — | — | — | — | — | — | — | — | — |
| | A-3-1 | 100 | — | — | — | — | — | — | — | — | — |
| | A-3-2 | — | 100 | — | — | — | — | — | — | — | — |
| | A-3-3 | — | — | 100 | — | — | — | — | — | — | 100 |
| | A-3-4 | — | — | — | 100 | — | — | — | — | — | — |
| | A-3-5 | — | — | — | — | 100 | — | — | — | — | — |
| | A-3-6 | — | — | — | — | — | 100 | — | — | — | — |
| polysiloxane | B-1 | 5 | — | — | — | 20 | — | — | — | — | — |
| | B-2 | — | 10 | — | — | — | — | — | — | — | — |
| | B-3 | — | — | 15 | — | — | — | — | — | — | — |
| | B-4 | — | — | — | 20 | — | — | — | — | — | — |
| | B-5 | — | — | — | — | 5 | — | — | — | — | — |

TABLE 5-continued

| Components Unit: parts by weight | | Comparative Examples | | | | | | | | | |
|---|---|---|---|---|---|---|---|---|---|---|---|
| | | 1 | 2 | 3 | 4 | 5 | 6 | 7 | 8 | 9 | 10 |
| | B-6 | — | — | — | — | — | — | — | — | — | — |
| | B'-1 | — | — | — | — | — | — | 5 | — | — | 10 |
| | B'-2 | — | — | — | — | — | — | — | 3 | — | — |
| Solvents | C-1 | 1200 | — | 1000 | — | — | 1400 | 1200 | 1400 | — | 850 |
| | C-2 | 600 | 1600 | — | 750 | 1500 | — | 600 | — | 1600 | 850 |
| | C-3 | — | — | 600 | 850 | 100 | — | — | — | — | — |
| Compound having at least 2 epoxy group | D-1 | — | — | — | 5 | — | — | — | — | — | — |
| | D-2 | — | — | — | — | — | — | — | — | — | — |
| | D-3 | — | — | — | — | — | — | — | — | — | 1 |
| Results | Ion density | X | X | X | X | X | X | X | X | X | X |

Note:
C-1: N-methyl-2-pyrrolidone
C-2: ethylene glycol n-butyl ether
C-3: N,N-dimethylacetamide
D-1: N,N,N',N'-tetraglycidyl-4,4'-diaminodiphenylmethane
D-2: N,N-glycidyl-p-glycidoxyaniline
D-3: propylene glycol diglycidyl ether As shown in Table 4, in Examples 1 to 15, a combination of the first and second diamine compounds represented by formulas (I) and (II) was used for obtaining the polymer compositions. The liquid crystal display elements which include the liquid crystal alignment films formed from the liquid crystal alignment agents including both the polymer compositions and the polysiloxanes have reduced ion density after UV irradiation.

As shown in Table 5, the liquid crystal display elements obtained in Comparative Examples 1 to 6 have increased ion density after UV irradiation. Specifically, in Comparative Examples 1 and 4, the first diamine compound of formula (1) was not used for obtaining the polymer compositions. In Comparative Examples 2 and 5, the second diamine compound of formula (2) was not used for obtaining the polymer compositions. In Comparative Examples 3 and 6, the first and second diamine compounds of formula (1) and (2) were not used for obtaining the polymer compositions.

In Comparative Examples 7 to 10, the polysiloxane specified in the disclosure was not used for obtaining the liquid crystal alignment agents. The liquid crystal display devices including liquid crystal alignment films formed thereby have increased ion densities after UV irradiation.

In addition, when the polymer composition has an imidization ratio ranging from 30% to 90%, the liquid crystal display element including the liquid crystal alignment film formed from the liquid crystal alignment agent has a lower ion density. Furthermore, when the compound having at least two epoxy groups in a molecule is employed, the ion density of the liquid crystal display element may be further reduced. Besides, a low ion density of a liquid crystal display element employing a liquid crystal alignment film formed from the liquid crystal alignment agent can be maintained even after long-term UV irradiation when the amount of the first silane compound of formula (III) is ranging from 0.3 to 1.0 mole.

In view of the aforesaid, in the disclosure, a liquid crystal alignment film having reduced ion density can be produced from a liquid crystal alignment agent which includes a polymer composition obtained using a combination of the first and second diamine compounds represented by formula (I) and (II), and the polysiloxane having an epoxy-based group. Furthermore, the liquid crystal display elements including the liquid crystal alignment film has reduced ion density.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A liquid crystal alignment agent, comprising:
a polymer composition obtained by subjecting a tetracarboxylic dianhydride component and a diamine component to a reaction;
a polysiloxane containing an epoxy-based group, an oxetane-based group, or a combination thereof; and
a solvent,
wherein said diamine component includes
a first diamine compound represented by formula (I):

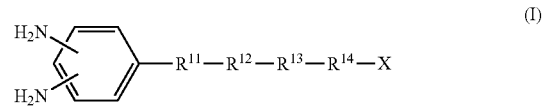

(I)

where
$R^{12}$ and $R^{14}$ are independently selected from the group consisting of

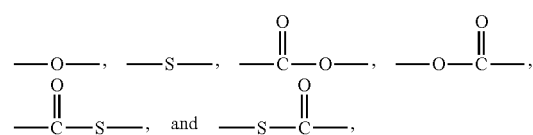

$R^{13}$ represents a $C_2$-$C_{10}$ alkylene group,
$R^{11}$ is selected from the group consisting of methylene and ethylene, and X represents a $C_{17}$-$C_{40}$ monovalent organic group having a steroid skeleton;
a second diamine compound represented by formula (II):

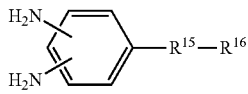
(II)

where
$R^{15}$ is selected from the group consisting of

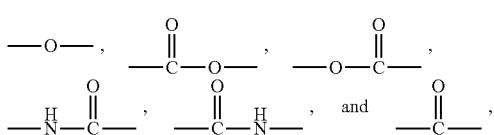

and
$R^{16}$ represents an organic group of formula (II-1):

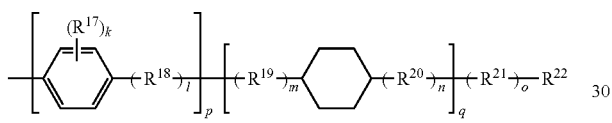
(II-1)

where
each $R^{17}$ is independently selected from the group consisting of hydrogen, fluorine, and methyl,
each of $R^{18}$, $R^{19}$ and $R^{20}$ is independently selected from the group consisting of a single bond,

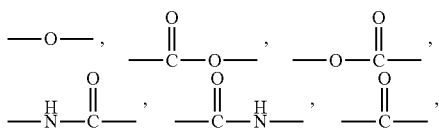

and a $C_1$-$C_3$ alkylene,
each $R^{21}$ is independently selected from the group consisting of

where
each of $R^{23}$ and $R^{24}$ is independently selected from the group consisting of hydrogen, fluorine, and methyl,
$R^{22}$ is selected from the group consisting of hydrogen, fluorine, a $C_1$-$C_{12}$ alkyl group, a $C_1$-$C_{12}$ fluoroalkyl group, a $C_1$-$C_{12}$ alkoxyl group, —OCH$_2$F, —OCHF$_2$, and —OCF$_3$,
k is an integer ranging from 1 to 2,
each of l, m, and n is independently an integer ranging from 0 to 4,
each of o, p, and q is independently an integer ranging from 0 to 3 with the proviso that the sum of o, p, and q is equal to or greater than 3, and
each of r and s is independently an integer ranging from 1 to 2; and
wherein said epoxy-based group is selected from the group consisting of functional groups of formula (B-1), formula (B-2), and a combination thereof, and said oxetane-based group is a functional group of formula (B-3),

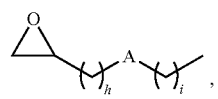
(B-1)

where
A is selected from the group consisting of oxygen, and a single bond,
h is an integer ranging from 1 to 3, and
i is an integer ranging from 0 to 6 with the proviso that A is a single bond when i is 0,

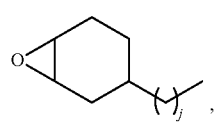
(B-2)

where j is an integer ranging from 0 to 6

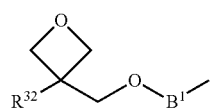
(B-3)

where $B^1$ represents a $C_2$-$C_6$ alkylene group, and
$R^{32}$ represents a hydrogen atom or a $C_1$-$C_6$ alkyl group.

2. The liquid crystal alignment agent according to claim 1, wherein said polysiloxane is obtained by subjecting a silane component to polycondensation, said silane component including
a silane compound of formula (III):

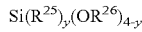
(III)

where
at least one $R^{25}$ is a functional group selected from the group consisting of said formula (B-1), said formula (B-2), said formula (B-3), and the combinations thereof, and the rest of $R^{25}$ is independently selected from the group consisting of a hydrogen atom, a $C_1$-$C_{10}$ alkyl group, a $C_2$-$C_{10}$ alkenyl group, a $C_6$-$C_{15}$ aryl group, and combinations thereof,
each $R^{26}$ is independently selected from the group consisting of a hydrogen atom, a $C_1$-$C_6$ alkyl group, a $C_1$-$C_6$ acyl group, a $C_6$-$C_{15}$ aryl group, and combinations thereof, and
Y is an integer ranging from 1 to 3;
wherein said silane compound of formula (III) is in an amount ranging from 0.3 to 1.0 mole based on 1 mole of said silane component.

3. The liquid crystal alignment agent according to claim 1, wherein said first diamine compound of formula (I) is in an amount ranging from 5 to 25 moles based on 100 moles of said diamine component.

4. The liquid crystal alignment agent according to claim 1, wherein said polymer composition has an imidization ratio ranging from 30% to 90%.

5. The liquid crystal alignment agent according to claim 1, wherein said polysiloxane is in an amount ranging from 3 to 30 parts by weight based on 100 parts by weight of said polymer composition.

6. The liquid crystal alignment agent according to claim 1, further comprising a compound having at least two epoxy groups in a molecule.

7. A liquid crystal alignment film formed from the liquid crystal alignment agent according to claim 1.

8. A liquid crystal display element, comprising the liquid crystal alignment film according to claim 7.

* * * * *